(12) United States Patent
Guild et al.

(10) Patent No.: US 8,992,324 B2
(45) Date of Patent: Mar. 31, 2015

(54) POSITION SENSING GESTURE HAND ATTACHMENT

(71) Applicant: WMS Gaming Inc., Waukegan, IL (US)

(72) Inventors: Charles V. Guild, Chicago, IL (US); Timothy C. Loose, Chicago, IL (US)

(73) Assignee: WMS Gaming Inc., Waukegan, IL (US)

( * ) Notice: Subject to any disclaimer, the term of this patent is extended or adjusted under 35 U.S.C. 154(b) by 105 days.

(21) Appl. No.: 13/756,865

(22) Filed: Feb. 1, 2013

(65) Prior Publication Data

US 2014/0018166 A1   Jan. 16, 2014

Related U.S. Application Data

(60) Provisional application No. 61/672,008, filed on Jul. 16, 2012.

(51) Int. Cl.
| | |
|---|---|
| A63F 9/24 | (2006.01) |
| A63F 13/20 | (2014.01) |
| G06F 3/01 | (2006.01) |
| A63F 13/98 | (2014.01) |
| G07F 17/32 | (2006.01) |

(52) U.S. Cl.
CPC ............ *A63F 13/06* (2013.01); *G06F 3/017* (2013.01); *A63F 13/02* (2013.01); *G07F 17/3206* (2013.01); *G07F 17/3209* (2013.01); *G06F 3/014* (2013.01); *G06F 3/016* (2013.01); *A63F 2300/1043* (2013.01); *A63F 2300/105* (2013.01); *A63F 2300/1087* (2013.01); *A63F 2300/6045* (2013.01)
USPC ................ 463/37; 463/16; 463/36; 463/47

(58) Field of Classification Search
CPC . A63F 2300/1012; A63F 3/016; G07F 17/32; G06F 13/06; G06F 3/14
See application file for complete search history.

(56) References Cited

U.S. PATENT DOCUMENTS

| | | | | |
|---|---|---|---|---|
| 5,616,078 | A * | 4/1997 | Oh | 463/8 |
| 6,586,942 | B2 * | 7/2003 | Lam | 324/426 |
| 6,638,166 | B2 * | 10/2003 | Hedrick et al. | 463/20 |
| 6,932,706 | B1 * | 8/2005 | Kaminkow | 463/36 |
| 7,092,785 | B2 * | 8/2006 | Alsio et al. | 700/168 |
| 7,309,286 | B2 * | 12/2007 | Hedrick et al. | 463/37 |
| 7,542,291 | B2 * | 6/2009 | Karrer et al. | 361/699 |
| 7,618,323 | B2 * | 11/2009 | Rothschild et al. | 463/37 |
| 7,942,744 | B2 | 5/2011 | Wells | |
| 8,062,115 | B2 | 11/2011 | Thomas et al. | |
| 2004/0166937 | A1 * | 8/2004 | Rothschild et al. | 463/36 |

(Continued)

*Primary Examiner* — Jay Liddle
*Assistant Examiner* — Alex F. R. P. Rada, II
(74) *Attorney, Agent, or Firm* — Nixon Peabody LLP

(57) ABSTRACT

An attachment worn against a palm side or a back side of a metacarpus of a person's hand. The attachment includes a flexible band or strip to which a sensing electronics module is attached that contains in a housing electronics for sensing gesture characteristics made by the wearer's hand, including a communications interface for communicating gesture characteristic data to a system external to the hand-worn attachment. The attachment sends at least position and orientation data in real time as a gesture is made to an external system, such as a gaming terminal. Optional sensors for detecting light, acceleration, orientation, or pressure can be used to detect other gesture characteristics and/or user inputs made while wearing the attachment. The gestures and user inputs can be used to influence graphical objects displayed on one or more displays displaying a program, such as a wagering game.

29 Claims, 13 Drawing Sheets

(56) References Cited

U.S. PATENT DOCUMENTS

| | | | |
|---|---|---|---|
| 2007/0149282 A1* | 6/2007 | Lu et al. | 463/36 |
| 2007/0259716 A1 | 11/2007 | Mattice et al. | |
| 2007/0259717 A1 | 11/2007 | Mattice et al. | |
| 2008/0076505 A1 | 3/2008 | Nguyen et al. | |
| 2009/0143141 A1 | 6/2009 | Wells et al. | |
| 2009/0231269 A1* | 9/2009 | Ueshima et al. | 345/156 |
| 2009/0305207 A1* | 12/2009 | Ueshima et al. | 434/258 |
| 2010/0009752 A1* | 1/2010 | Rubin et al. | 463/36 |
| 2010/0087241 A1 | 4/2010 | Nguyen et al. | |
| 2010/0234094 A1 | 9/2010 | Gagner et al. | |
| 2011/0009194 A1* | 1/2011 | Gabai et al. | 463/36 |
| 2011/0118013 A1 | 5/2011 | Mattice et al. | |
| 2011/0134034 A1* | 6/2011 | Daniel | 345/158 |
| 2011/0212778 A1 | 9/2011 | Wells | |
| 2011/0269544 A1* | 11/2011 | Daniel | 463/37 |
| 2012/0184371 A1* | 7/2012 | Shum et al. | 463/36 |

\* cited by examiner

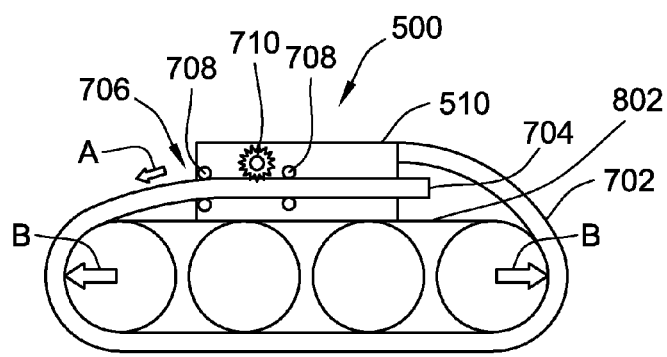
FIG. 7
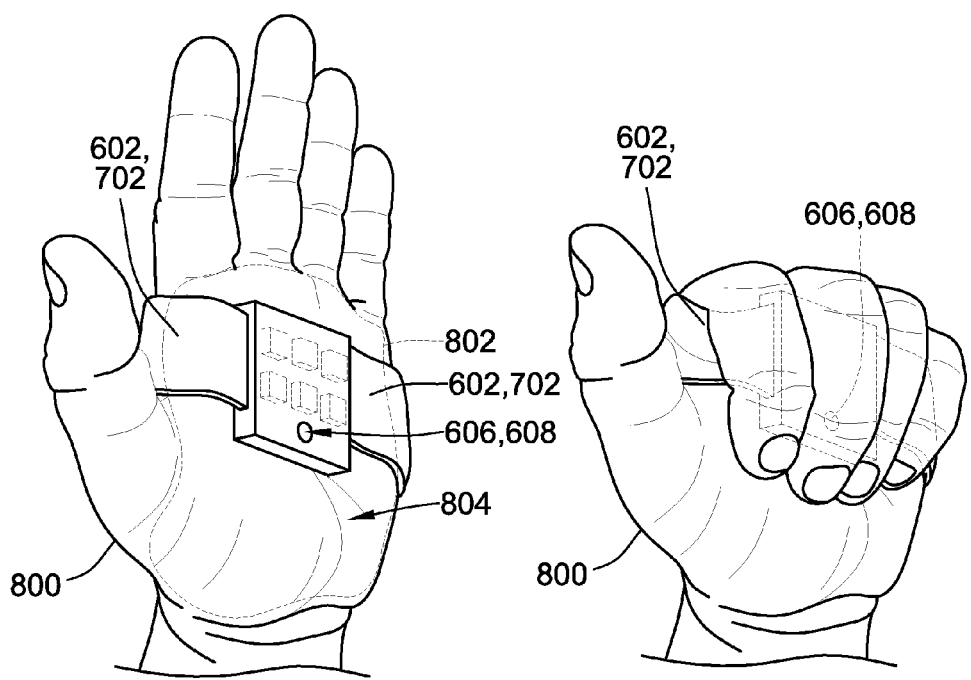
FIG. 8A  FIG. 8B

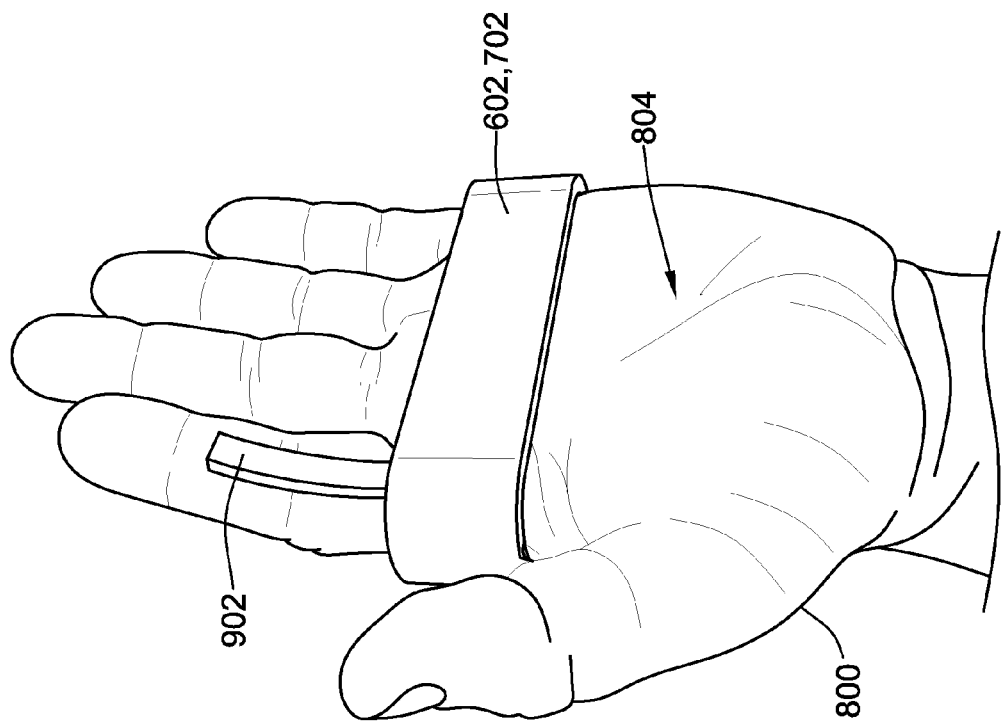
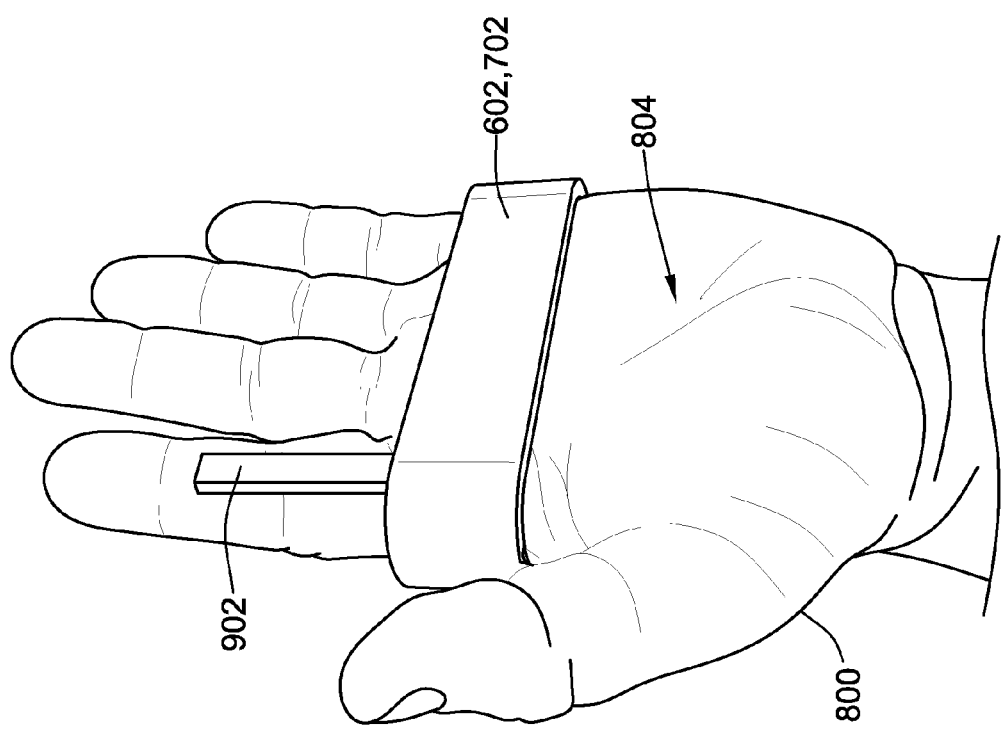

FIG. 10A
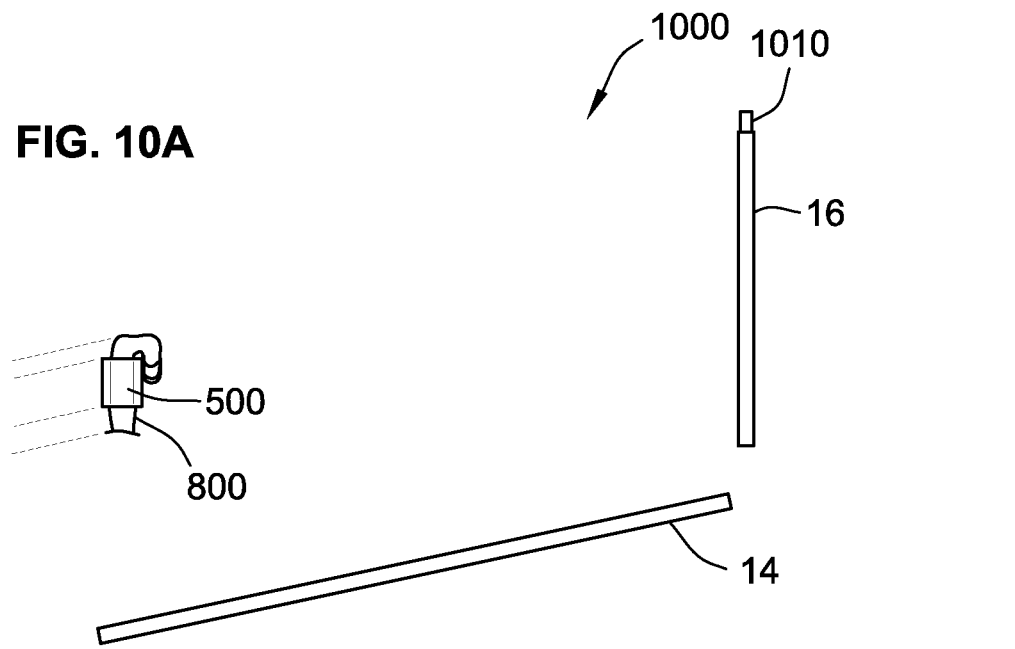
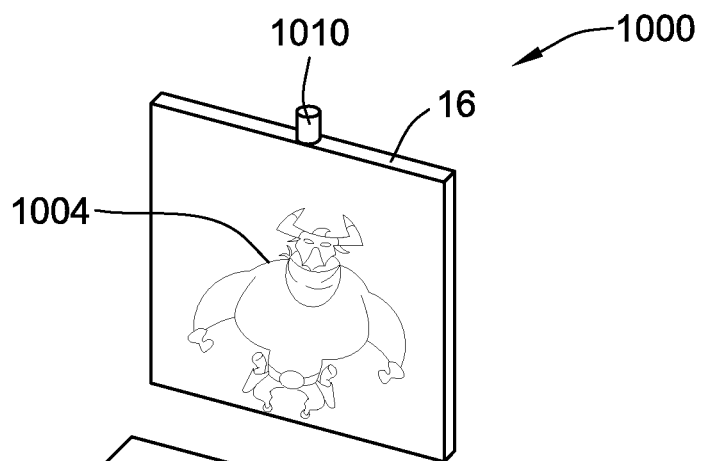
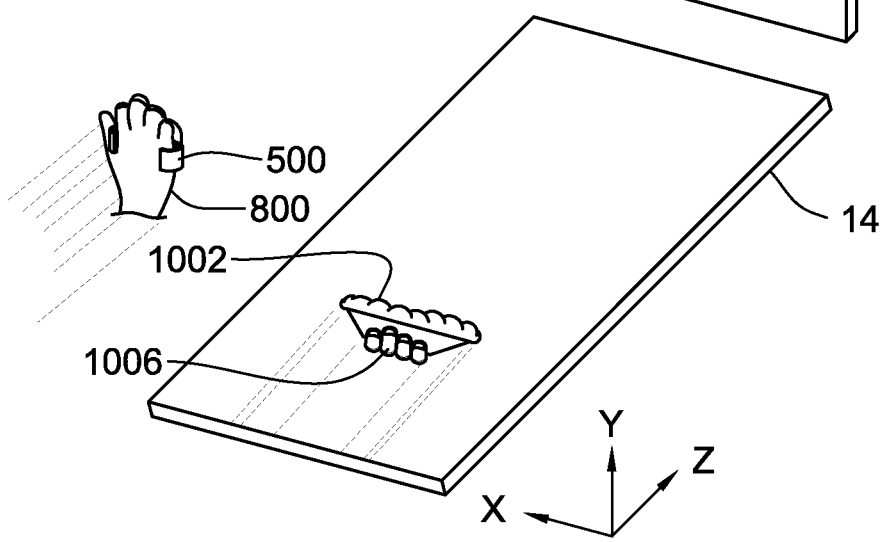
FIG. 10B

FIG. 11C
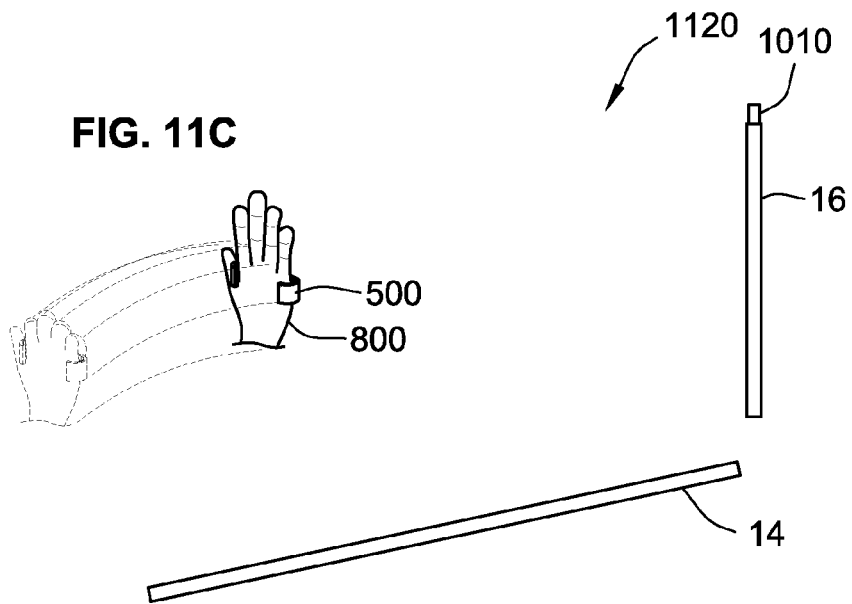
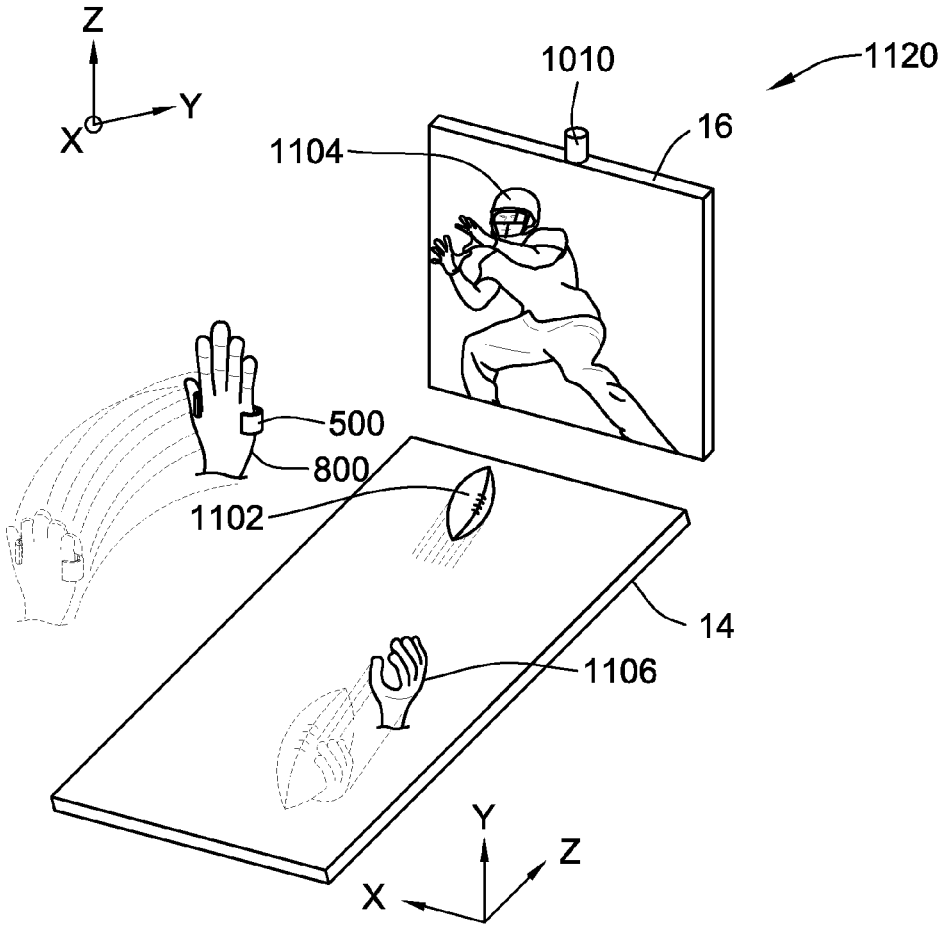
FIG. 11D

POSITION SENSING GESTURE HAND ATTACHMENT

CROSS-REFERENCE TO RELATED APPLICATION

This application claims the benefit of U.S. Provisional Patent Application No. 61/672,008, filed Jul. 16, 2012, entitled "Position Sensing Gesture Hand Attachment" which is hereby incorporated by reference in its entirety.

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE PRESENT DISCLOSURE

The present disclosure relates generally to sensing systems, and more particularly, to gesture sensing systems and methods that sense and process gestures made by a hand of a human wearing a hand attachment with sensing electronics incorporated into the attachment.

BACKGROUND

Gaming terminals, such as slot machines, video poker machines and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options. Where the available gaming options include a number of competing machines and the expectation of winning at each machine is roughly the same (or believed to be the same), players are likely to be attracted to the most entertaining and exciting machines. Shrewd operators consequently strive to employ the most entertaining and exciting machines, features, and enhancements available because such machines attract frequent play and hence increase profitability to the operator. Therefore, there is a continuing need for gaming machine manufacturers to continuously develop new games and improved gaming enhancements that will attract frequent play through enhanced entertainment value to the player.

SUMMARY

According to an aspect of the present disclosure, a hand-worn attachment for sensing a gesture includes: a thin flexible element configured to be worn against a metacarpus of a hand in a fixed relationship thereto, the flexible element being bendable and elongated and remaining in place relative to the hand as the hand is moved, a portion of the flexible element wrapping around a side of the metacarpus; and a sensing electronics module coupled to the flexible element, the sensing electronics module including sensing electronics configured to detect a position and an orientation of the flexible element as the hand against which the flexible element is worn makes a gesture, the sensing electronics module further including a communications interface configured to communicate position and orientation data corresponding to the position and the orientation of the flexible element as the gesture is made.

The sensing electronics can include a sensor responsive to a movement of one or more fingers of the hand to produce a user input signal indicative of a user input that is communicated via the communications interface. The sensor can be a light sensor positioned relative to the flexible element such that the movement of the one or more fingers corresponds to a closure of the hand to block the light sensor and thereby produce the user input signal. The sensor can be a contact sensor positioned relative to the flexible element such that the movement of the one or more fingers corresponds to closure of the one or more fingers against the metacarpus to make contact with the contact sensor thereby producing the user input signal. The sensor can be a tension sensor positioned relative to the flexible element to monitor a tension or pressure applied to the flexible element as the one or more fingers move from an open position to a closed position to increase the tension or pressure sensed by the tension sensor thereby producing the user input signal. The sensor can be a switch coupled to an extension that protrudes lengthwise along at least a part of the one or more fingers such that the movement causes a state of the switch to change to cause the user input signal to be generated.

The flexible element can be composed of a bendable, compliant material that conforms to a back side of the metacarpus opposing a palm side of the hand, the portion of the flexible element including opposing end portions that wrap around respective opposite sides of the metacarpus. The flexible element can be a band composed of an elastic material and when the sensing electronics module is worn against a palm side of the metacarpus of the hand. The sensing electronics can be configured to sense a movement of one or more fingers of the hand to produce a user input signal indicative of a user input, and the user input signal can be transmitted by the communications interface.

The sensing electronics can include a wireless transducer configured to use electromagnetic signals for determining at least one of the position or the orientation of the flexible element. The sensing electronics module can further include a haptic device for imparting haptic feedback to the hand in response to haptic input signals received by the communications interface. The sensing electronics module can further include a magnetometer for determining an orientation of the flexible element. The magnetometer can produce orientation data indicative of the determined orientation. The sensing electronics module can further include one or more inertial sensors that sense an acceleration movement of the flexible element and a direction of the acceleration movement.

The communications interface can be coupled to conductors carrying power and data signals between the sensing electronics module and a system external to the attachment. In an implementation, no part of the attachment contacts an extremity portion of any finger of the hand as the attachment is worn against the metacarpus when the hand is in an open palm position. For example, all fingers of the hand can be free to make other inputs when the attachment is worn on the hand.

According to another aspect of the present disclosure, a gaming system configured to conduct a wagering game includes: one or more input devices; one or more display devices; one or more processors; an external system interface; a hand-worn attachment for sensing a gesture, the attachment including: a thin flexible element configured to be worn against a metacarpus of a hand in a fixed relationship thereto, the flexible element being bendable and elongated and remaining in place relative to the hand as the hand is moved, a portion of the flexible element wrapping around a side of the metacarpus, and a sensing electronics module coupled to the flexible element, the sensing electronics module including sensing electronics configured to detect a position of the flexible element as the hand against which the flexible element is worn makes a gesture, the sensing electronics module further including a communications interface configured to communicate to the external system interface position data corresponding to the position of the flexible element as the gesture is made; and one or more memory devices storing instructions that, when executed by the at least one or more processors, cause the gaming system to: receive an input, via the one or more input devices, indicative of a wager; cause a wagering game to be displayed on the one or more display devices; and receive the position data from the attachment as the wagering game is displayed on the one or more display devices.

The attachment can further include a haptic device for imparting haptic feedback to the hand in response to haptic input signals received by the communications interface of the attachment. The one or more memory devices can further cause the gaming system to communicate via the external system interface to the communications interface of the attachment the haptic input signals as the wagering game is displayed on the one or more display devices.

The one or more memory devices can further cause the gaming system to: cause to be displayed on at least one of the one or more display devices a graphic that is part of the wagering game, where the graphic appears to move with the attachment as the gesture is made; receive at the external system interface from the communications interface of the attachment a user input signal indicating that the gesture no longer affects the movement of the graphic, and responsive thereto, cause the graphic to appear to move in a manner that is not influenced by any gesture made by the attachment.

The user input signal can be produced by the attachment detecting a transition of the hand between a closed first position and an open palm position. The one or more memory devices can further cause the gaming system to: cause to be displayed on at least one of the one or more display devices a graphic that is part of the wagering game, where the graphic appears to be grasped by the hand of the player wearing the attachment while the gesture is made; receive at the external system interface from the communications interface of the attachment a user input signal indicating a release of the graphic from appearing to be grasped by the hand such that the gesture no longer affects the movement of the graphic, and responsive thereto, cause the graphic to appear to move in a manner that is not influenced by any gesture made by the attachment.

The user input signal can be produced by the attachment detecting a transition of the hand from a closed first position to an open palm position. The one or more memory devices can further cause the gaming system to: responsive to receiving the user input signal, receive at the external system interface from the communications interface of the attachment orientation data indicating a change in an orientation of the attachment, and responsive thereto, cause a trajectory of the graphic to appear to change in a manner corresponding to the orientation data as displayed on at least one of the one or more display devices.

The gaming system can further include: a second hand-worn attachment for sensing a gesture made by a second player, the second attachment including: a thin flexible element configured to be worn against a metacarpus of a hand of the second player in a fixed relationship relative to the metacarpus of the hand of the second user, the flexible element of the second attachment being bendable and elongated and remaining in place relative to the hand of the second player as the hand of the second user is moved, a portion of the flexible element of the second attachment wrapping around a side of the metacarpus of the hand of the second player, and a sensing electronics module coupled to the flexible element of the second attachment, the sensing electronics module of the second attachment including sensing electronics configured to detect a position of the flexible element of the second attachment as the hand of the second player against which the flexible element of the second attachment is worn makes a gesture, the sensing electronics module of the second attachment further including a communications interface configured to communicate to the external system interface position data corresponding to the position of the flexible element of the second attachment as the gesture is made by the hand of the second player; wherein the instructions further cause the gaming system to: cause to be displayed on at least one of the one or more display devices a graphic that is part of the wagering game and whose movement is controlled by a first player wearing the attachment and a second player wearing the second attachment; and cause the graphic to move in a manner influenced by the position data from the attachment worn by the first player and the position data from the second attachment worn by the second player.

According to yet another aspect of the present disclosure, a computer-implemented method of conducting wagering games on a wagering game system is provided. The wagering game system includes one or more input devices, one or more display devices, and one or more processors. The method includes: receiving, via at least one of the one or more input devices, a wager to initiate a wagering game on the wagering game system; displaying, via at least one of the one or more display devices, a graphic that is part of the wagering game; randomly selecting, via at least one of the one or more processors, a game outcome from a plurality of game outcomes; receiving at an external system interface from a hand-worn attachment having a thin flexible element configured to be worn against a metacarpus of a hand in a fixed relationship thereto, position data indicating a position of the attachment in three-dimensional space; and causing the graphic to be displayed, via at least one of the one or more display devices, so as to move in a manner corresponding to the position data received from the attachment.

The flexible element can be bendable and remain in place relative to the hand as the hand is moved. A portion of the flexible element can wrap around a side of the metacarpus. An overall length dimension of the flexible element can be greater than an overall width dimension thereof. The computer-implemented method can further include: receiving at the external system interface from the communications interface of the attachment a user input signal indicating that the gesture no longer affects the movement of the graphic, and responsive thereto, causing the graphic to appear to move in a manner that is not influenced by any gesture made by the attachment.

The computer-implemented method can further include: portraying the graphic as appearing to be grasped by the hand of the player wearing the attachment while the gesture is made; and receiving at the external system interface a user input signal from the attachment, indicating a release of the graphic from appearing to be grasped by the hand such that the gesture no longer affects the movement of the graphic, and responsive thereto, causing the graphic to appear to move in a manner that is not influenced by any gesture made by the attachment.

The computer-implemented method can further include: responsive to receiving the user input signal, receiving at the external system interface from the attachment orientation data indicating a change in an orientation of the attachment, and responsive thereto, causing a trajectory of the graphic to appear to change in a manner corresponding to the orientation data as displayed via at least one of the one or more display devices.

According to still another aspect of the present disclosure, one or more physical machine-readable storage media including instructions which, when executed by one or more processors, cause the one or more processors to perform operations that include: receiving, via at least one of the one or more input devices, a wager to initiate a wagering game on the wagering game system; displaying, via at least one of the one or more display devices, a graphic that is part of the wagering game; randomly selecting, via at least one of the one or more processors, a game outcome from a plurality of game outcomes; receiving at an external system interface from a hand-worn attachment having a thin flexible element configured to be worn against a metacarpus of a hand in a fixed relationship thereto, position data indicating a position of the attachment in three-dimensional space; and causing the graphic to be displayed, via at least one of the one or more display devices, so as to move in a manner corresponding to the position data received from the attachment.

The flexible element can be bendable and remain in place relative to the hand as the hand is moved. A portion of the flexible element can wrap around a side of the metacarpus. An overall length dimension of the flexible element can be greater than an overall width dimension thereof. The operations can further include: receiving at the external system interface from the communications interface of the attachment a user input signal indicating that the gesture no longer affects the movement of the graphic, and responsive thereto, causing the graphic to appear to move in a manner that is not influenced by any gesture made by the attachment. The operations can further include: portraying the graphic as appearing to be grasped by the hand of the player wearing the attachment while the gesture is made; and receiving at the external system interface a user input signal from the attachment, indicating a release of the graphic from appearing to be grasped by the hand such that the gesture no longer affects the movement of the graphic, and responsive thereto, causing the graphic to appear to move in a manner that is not influenced by any gesture made by the attachment.

The operations can further include: responsive to receiving the user input signal, receiving at the external system interface from the attachment orientation data indicating a change in an orientation of the attachment, and responsive thereto, causing a trajectory of the graphic to appear to change in a manner corresponding to the orientation data as displayed via at least one of the one or more display devices.

Additional aspects of the present disclosure will be apparent to those of ordinary skill in the art in view of the detailed description of various embodiments, which is made with reference to the drawings, a brief description of which is provided below.

BRIEF DESCRIPTION OF THE DRAWINGS

FIG. 7 is an end view of another example of an adjustable flexible attachment that resembles a band that wraps around the metacarpus of a human hand.

FIG. 8A illustrates a human hand wearing the attachment against a palm side of the metacarpus, where the hand is in an open palm position.

FIG. 8B illustrates the same hand shown in FIG. 8A, except in a closed first position.

FIG. 9A illustrates a human hand wearing an attachment according to aspects of the present disclosure with an extension that protrudes away from the attachment against a finger.

FIG. 9B illustrates the hand shown in FIG. 9A with the finger slightly bent, causing the extension to bend, which is interpreted as a user input by the attachment.

FIGS. 10A-10D illustrate example sequences of a gesture and user input using the attachment that resemble launching an object toward a target.

FIGS. 11A-11D illustrate example sequences of multiple gestures and user input using the attachment that resemble launching an object toward a target and then changing an orientation of the attachment to influence the trajectory of the object after it has been launched responsive to the user input.

Figure 1:
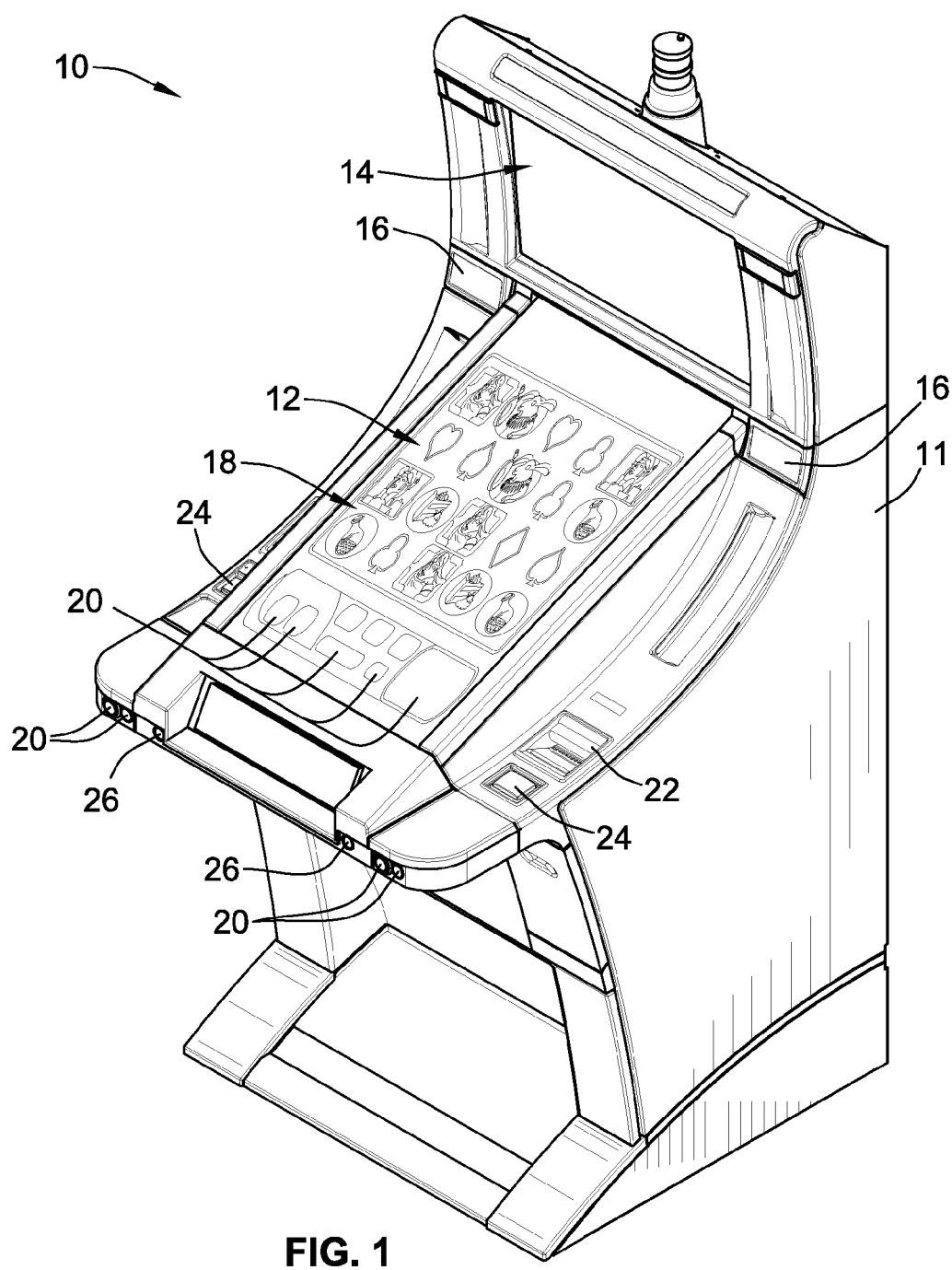
FIG. 1 is a perspective view of a free-standing gaming terminal according to an aspect of the present disclosure.

While the present disclosure is susceptible to various modifications and alternative forms, specific embodiments have been shown by way of example in the drawings and will be described in detail herein. It should be understood, however, that the present disclosure is not intended to be limited to the particular forms disclosed. Rather, this disclosure is to cover all modifications, equivalents, and alternatives falling within the spirit and scope of the invention as defined by the appended claims.

DETAILED DESCRIPTION

While aspects of this disclosure are susceptible of embodiment in many different forms, there is shown in the drawings and will herein be described in detail preferred embodiments of the disclosed aspects with the understanding that the present disclosure is to be considered as an exemplification of the principles of the disclosure and is not intended to limit the broad aspects of the disclosure to the embodiments or aspects illustrated.

Referring to FIG. 1, there is shown a gaming terminal 10 similar to those used in gaming establishments, such as casinos. With regard to the present disclosure, the gaming terminal 10 may be any type of gaming terminal and may have varying structures and methods of operation. For example, in some aspects, the gaming terminal 10 is an electromechanical gaming terminal configured to play mechanical slots, whereas in other aspects, the gaming terminal is an electronic gaming terminal configured to play a video casino game, such as slots, keno, poker, blackjack, roulette, craps, etc. The gaming terminal 10 may take any suitable form, such as floor-standing models as shown, handheld mobile units, bartop models, workstation-type console models, etc. Further, the gaming terminal 10 may be primarily dedicated for use in conducting wagering games, or may include non-dedicated devices, such as mobile phones, personal digital assistants, personal computers, etc. Exemplary types of gaming terminals are disclosed in U.S. Pat. No. 6,517,433 and Patent Application Publication Nos. US2010/0069160 and US2010/0234099, which are incorporated herein by reference in their entireties.

The gaming terminal 10 illustrated in FIG. 1 comprises a cabinet 11 that may house various input devices, output devices, and input/output devices. By way of example, the gaming terminal 10 includes a primary display area 12, a secondary display area 14, and one or more audio speakers 16. The primary display area 12 or the secondary display area 14 may be a mechanical-reel display, a video display, or a combination thereof in which a transmissive video display is disposed in front of the mechanical-reel display to portray a video image superimposed upon the mechanical-reel display. The display areas may variously display information associated with wagering games, non-wagering games, community games, progressives, advertisements, services, premium entertainment, text messaging, emails, alerts, announcements, broadcast information, subscription information, etc. appropriate to the particular mode(s) of operation of the gaming terminal 10. The gaming terminal 10 includes a touch screen(s) 18 mounted over the primary or secondary areas, buttons 20 on a button panel, bill validator 22, information reader/writer(s) 24, and player-accessible port(s) 26 (e.g., audio output jack for headphones, video headset jack, USB port, wireless transmitter/receiver, etc.). It should be understood that numerous other peripheral devices and other elements exist and are readily utilizable in any number of combinations to create various forms of a gaming terminal in accord with the present concepts.

Input devices, such as the touch screen 18, buttons 20, a mouse, a joystick, a gesture-sensing device, a voice-recognition device, and a virtual input device, accept player input(s) and transform the player input(s) to electronic data signals indicative of the player input(s), which correspond to an enabled feature for such input(s) at a time of activation (e.g., pressing a "Max Bet" button or soft key to indicate a player's desire to place a maximum wager to play the wagering game). The input(s), once transformed into electronic data signals, are output to a CPU for processing. The electronic data signals are selected from a group consisting essentially of an electrical current, an electrical voltage, an electrical charge, an optical signal, an optical element, a magnetic signal, and a magnetic element.

Figure 2:
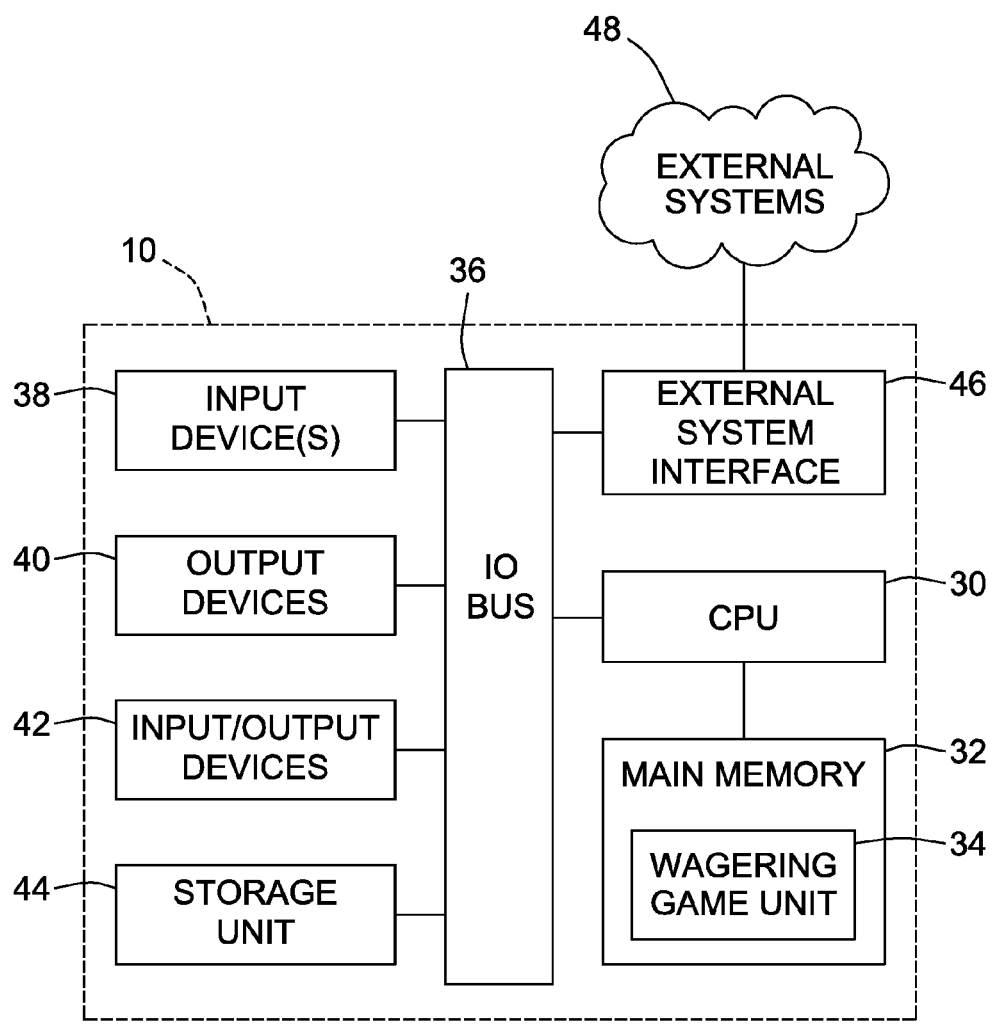
FIG. 2 is a schematic view of a gaming system according to an aspect of the present disclosure.

Turning now to FIG. 2, there is shown a block diagram of the gaming-terminal architecture. The gaming terminal 10 includes a central processing unit (CPU) 30 connected to a main memory 32. The CPU 30 may include any suitable processor(s), such as those made by Intel and AMD. By way of example, the CPU 30 includes a plurality of microprocessors including a master processor, a slave processor, and a secondary or parallel processor. CPU 30, as used herein, comprises any combination of hardware, software, or firmware disposed in or outside of the gaming terminal 10 that is configured to communicate with or control the transfer of data between the gaming terminal 10 and a bus, another computer, processor, device, service, or network. The CPU 30 comprises one or more controllers or processors and such one or more controllers or processors need not be disposed proximal to one another and may be located in different devices or in different locations. The CPU 30 is operable to execute all of the various gaming methods and other processes disclosed herein. The main memory 32 includes a wagering game unit 34. In one embodiment, the wagering game unit 34 may present wagering games, such as video poker, video black jack, video slots, video lottery, etc., in whole or part.

The CPU 30 is also connected to an input/output (I/O) bus 36, which can include any suitable bus technologies, such as an AGTL+ frontside bus and a PCI backside bus. The I/O bus 36 is connected to various input devices 38, output devices 40, and input/output devices 42 such as those discussed above in connection with FIG. 1. The I/O bus 36 is also connected to storage unit 44 and external system interface 46, which is connected to external system(s) 48 (e.g., wagering game networks).

The external system 48 includes, in various aspects, a gaming network, other gaming terminals, a gaming server, a remote controller, communications hardware, or a variety of other interfaced systems or components, in any combination. In yet other aspects, the external system 48 may comprise a player's portable electronic device (e.g., cellular phone, electronic wallet, etc.) and the external system interface 46 is configured to facilitate wireless communication and data transfer between the portable electronic device and the CPU 30, such as by a near-field communication path operating via magnetic-field induction or a frequency-hopping spread spectrum RF signals (e.g., Bluetooth, etc.).

The gaming terminal 10 optionally communicates with the external system 48 such that the terminal operates as a thin, thick, or intermediate client. In general, a wagering game includes an RNG for generating a random number, game logic for determining the outcome based on the randomly generated number, and game assets (e.g., art, sound, etc.) for presenting the determined outcome to a player in an audio-visual manner. The RNG, game logic, and game assets are contained within the gaming terminal 10 ("thick client" gaming terminal), the external system 48 ("thin client" gaming terminal), or are distributed therebetween in any suitable manner ("intermediate client" gaming terminal).

The gaming terminal 10 may include additional peripheral devices or more than one of each component shown in FIG. 2. Any component of the gaming terminal architecture may include hardware, firmware, or tangible machine-readable storage media including instructions for performing the operations described herein. Machine-readable storage media includes any mechanism that stores information and provides the information in a form readable by a machine (e.g., gaming terminal, computer, etc.). For example, machine-readable storage media includes read only memory (ROM), random access memory (RAM), magnetic disk storage media, optical storage media, flash memory, etc.

Figure 3:
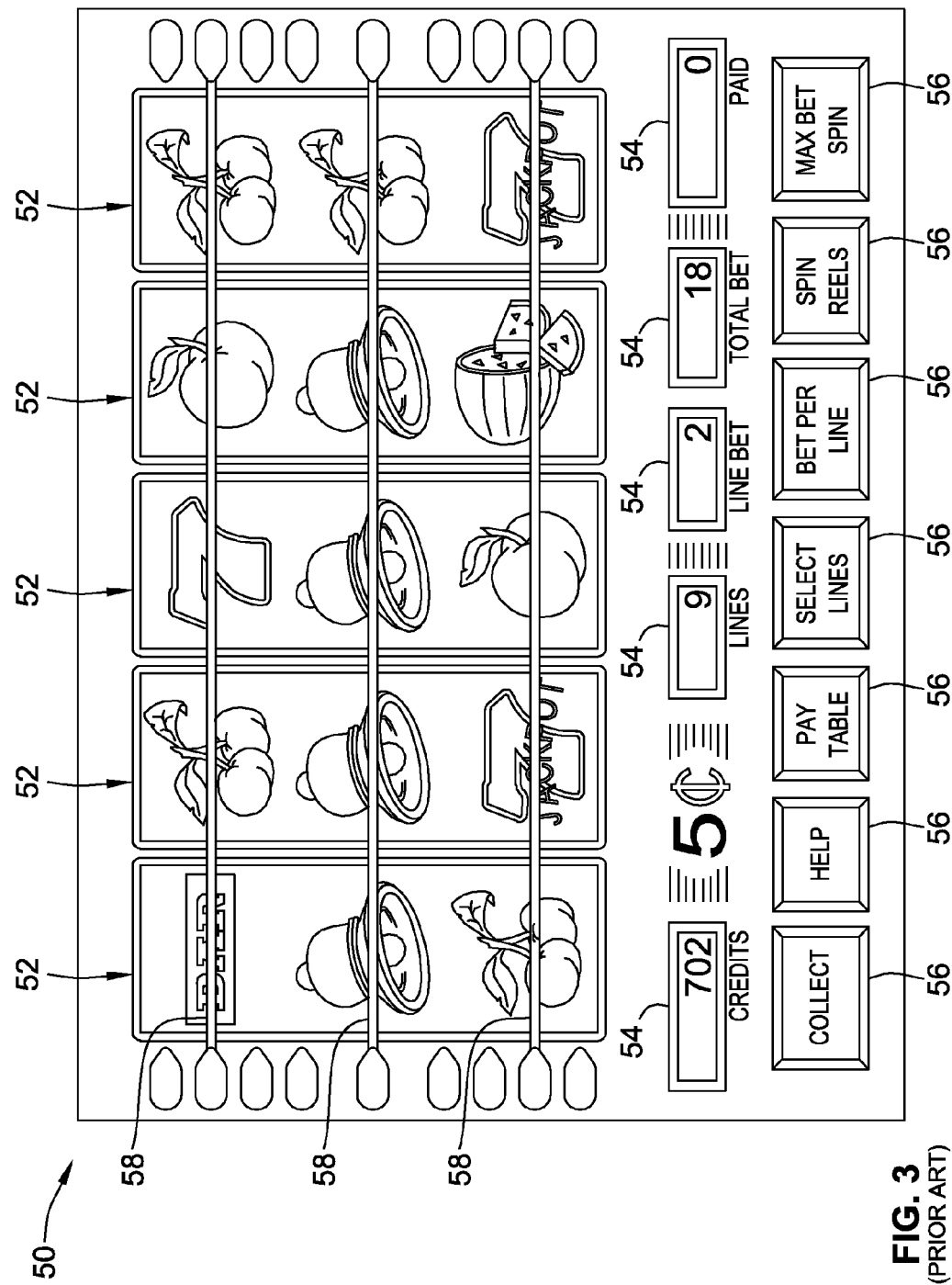
FIG. 3 is an image of an exemplary basic-game screen of a wagering game displayed on a gaming terminal, according to an aspect of the present disclosure.

Referring now to FIG. 3, there is illustrated an image of a basic-game screen 50 adapted to be displayed on the primary display area 12 or the secondary display area 14. The basic-game screen 50 portrays a plurality of simulated symbol-bearing reels 52. Alternatively or additionally, the basic-game screen 50 portrays a plurality of mechanical reels or other video or mechanical presentation consistent with the game format and theme. The basic-game screen 50 also advantageously displays one or more game-session credit meters 54 and various touch screen buttons 56 adapted to be actuated by a player. A player can operate or interact with the wagering game using these touch screen buttons or other input devices such as the buttons 20 shown in FIG. 1. The CPU operate(s)

to execute a wagering game program causing the primary display area 12 or the secondary display area 14 to display the wagering game.

In response to receiving a wager, the reels 52 are rotated and stopped to place symbols on the reels in visual association with paylines such as paylines 58. The wagering game evaluates the displayed array of symbols on the stopped reels and provides immediate awards and bonus features in accordance with a pay table. The pay table may, for example, include "line pays" or "scatter pays." Line pays occur when a predetermined type and number of symbols appear along an activated payline, typically in a particular order such as left to right, right to left, top to bottom, bottom to top, etc. Scatter pays occur when a predetermined type and number of symbols appear anywhere in the displayed array without regard to position or paylines. Similarly, the wagering game may trigger bonus features based on one or more bonus triggering symbols appearing along an activated payline (i.e., "line trigger") or anywhere in the displayed array (i.e., "scatter trigger"). The wagering game may also provide mystery awards and features independent of the symbols appearing in the displayed array.

In accord with various methods of conducting a wagering game on a gaming system in accord with the present concepts, the wagering game includes a game sequence in which a player makes a wager and a wagering game outcome is provided or displayed in response to the wager being received or detected. The wagering game outcome is then revealed to the player in due course following initiation of the wagering game. The method comprises the acts of conducting the wagering game using a gaming apparatus, such as the gaming terminal 10 depicted in FIG. 1, following receipt of an input from the player to initiate the wagering game. The gaming terminal 10 then communicates the wagering game outcome to the player via one or more output devices (e.g., primary display 12 or secondary display 14) through the display of information such as, but not limited to, text, graphics, static images, moving images, etc., or any combination thereof. In accord with the method of conducting the wagering game, the CPU transforms a physical player input, such as a player's pressing of a "Spin Reels" touch key, into an electronic data signal indicative of an instruction relating to the wagering game (e.g., an electronic data signal bearing data on a wager amount).

In the aforementioned method, for each data signal, the CPU (e.g., CPU 30) is configured to process the electronic data signal, to interpret the data signal (e.g., data signals corresponding to a wager input), and to cause further actions associated with the interpretation of the signal in accord with computer instructions relating to such further actions executed by the controller. As one example, the CPU causes the recording of a digital representation of the wager in one or more storage media (e.g., storage unit 44), the CPU, in accord with associated computer instructions, causing the changing of a state of the storage media from a first state to a second state. This change in state is, for example, effected by changing a magnetization pattern on a magnetically coated surface of a magnetic storage media or changing a magnetic state of a ferromagnetic surface of a magneto-optical disc storage media, a change in state of transistors or capacitors in a volatile or a non-volatile semiconductor memory (e.g., DRAM), etc. The noted second state of the data storage media comprises storage in the storage media of data representing the electronic data signal from the CPU (e.g., the wager in the present example). As another example, the CPU further, in accord with the execution of the instructions relating to the wagering game, causes the primary display 12, other display device, or other output device (e.g., speakers, lights, communication device, etc.) to change from a first state to at least a second state, wherein the second state of the primary display comprises a visual representation of the physical player input (e.g., an acknowledgement to a player), information relating to the physical player input (e.g., an indication of the wager amount), a game sequence, an outcome of the game sequence, or any combination thereof, wherein the game sequence in accord with the present concepts comprises acts described herein. The aforementioned executing of computer instructions relating to the wagering game is further conducted in accord with a random outcome (e.g., determined by a RNG) that is used by the CPU to determine the outcome of the game sequence, using a game logic for determining the outcome based on the randomly generated number. In at least some aspects, the CPU is configured to determine an outcome of the game sequence at least partially in response to the random parameter.

Figure 5:
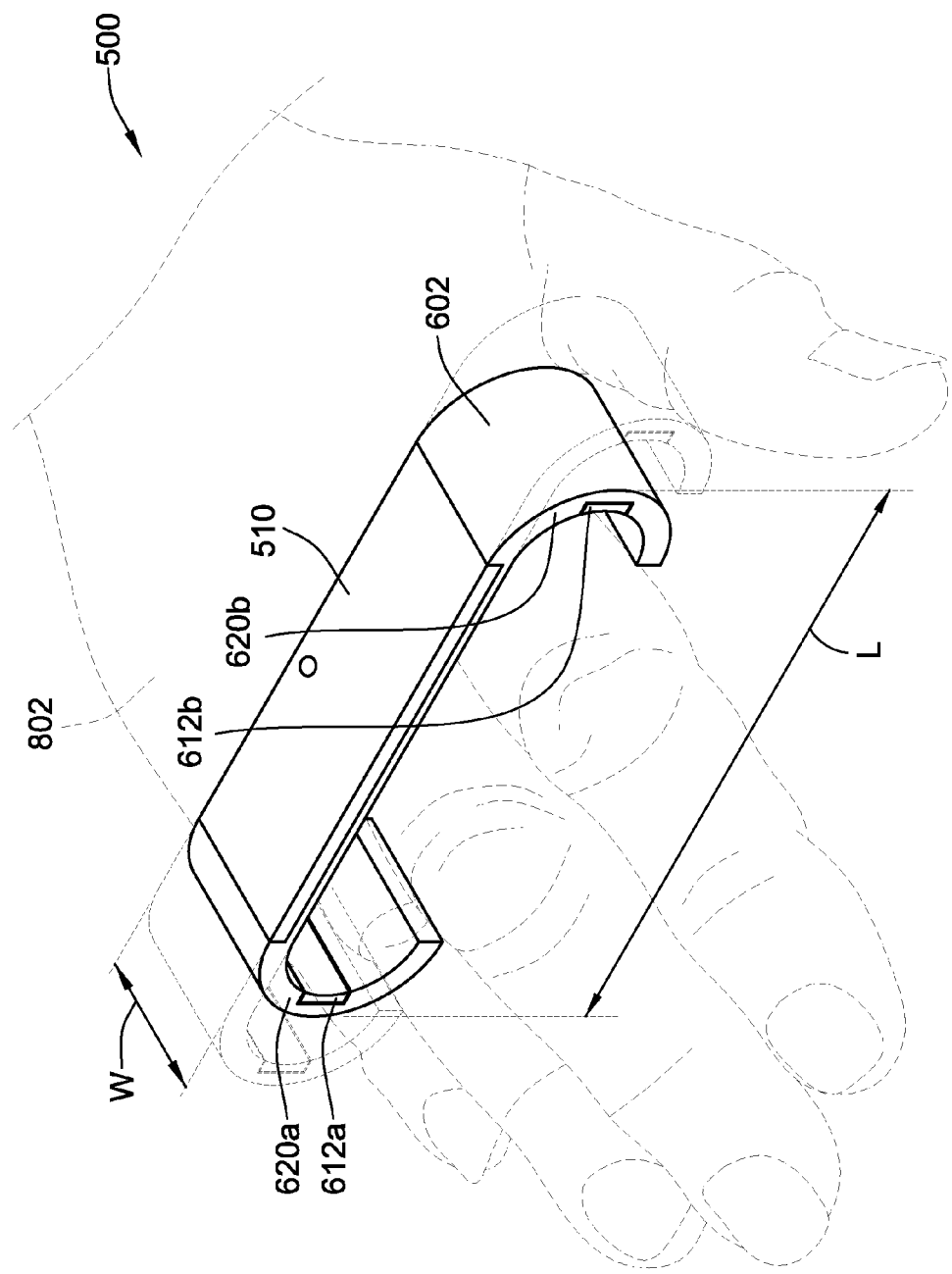
FIG. 5 is a perspective view of an example flexible or stretchable attachment that snaps around part of a metacarpus portion of a human hand.
Figure 6:
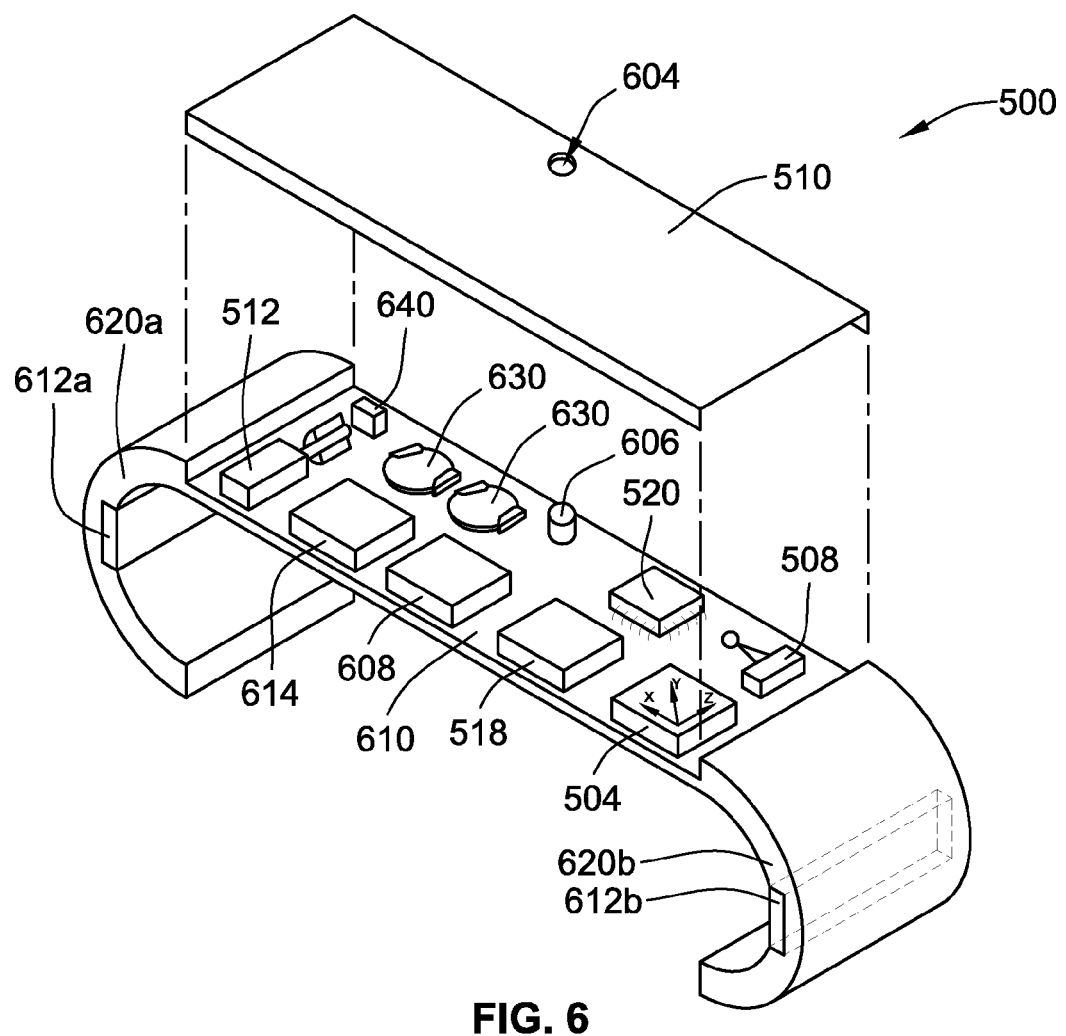
FIG. 6 is a perspective view of a cover of the attachment shown in FIG. 5 removed to reveal example components, shown in schematic form, that can be housed inside the attachment.

Aspects of the present disclosure relate to a hand-worn attachment 500 for sensing a gesture. The attachment 500 includes a thin flexible element 602, 702 (such as shown in FIGS. 5, 6, and 7) that can be configured to be worn on, around, or against a metacarpus 802 (shown in dashed lines in FIG. 8A) of a hand 800 in a fixed relationship relative to the metacarpus 802. The terms "on, around, or against" in this context are used interchangeably. The attachment 500 differs from a device that is grasped by the hand, such as a wand, in that the fingers of the hand relative to which the attachment 500 is worn in aspects of the present disclosure, and in particular the pointer finger, are free to make other gestures or inputs relative to a human-machine interface while also making gestures or inputs using the attachment itself. Unlike a device that is grasped, the attachment 500 does not interfere with the wearer's ability to use the fingers to do other things. The attachment 500 also lends itself to natural human movements that cannot be captured by a grasped device. In this sense, this attachment 500 is "worn" relative to the hand instead of being grasped by fingers thereby. For example, a motion to throw a pie in someone's face would not naturally involve grasping a device to capture the pie-throwing gesture. Or a gesture made with an open hand would not naturally involve grasping a device. So these gestures and others would not feel natural if the user were required to use fingers to grasp a device (like a wand or a gun) while making such gestures. In the same respect, when used in connection with a human-machine interface to make gesture inputs and/or other inputs between a human and a machine, such as a controller-based electromechanical or electronic device like a gaming terminal 10 or an external system 46, the human is free to make other inputs, such as button presses, tactile inputs on a touchpad and the like, without having to let go of the device 500 being worn. If the human wearer is right-handed, such a person will tend to wear the attachment 500 on the right hand and also make inputs with that same hand. It is not practical to require such human to use the left hand for making gestures or inputs that that human would not naturally and instinctively do with that hand. With devices that need to be grasped, such as wands or guns, the wearer usually grasps these devices with the hand indicated by their handedness.

In some aspects, no part of the attachment 500 contacts an extremity portion of any finger of the hand as the attachment 500 is worn against the metacarpus 802 when the hand is in an open palm position. Some or all fingers of the hand are free to make other inputs when the attachment 500 is worn on the hand. In other aspects, if a portion or portions of the attachment 500 do contact portions of one or more fingers, the wearer is still free to use the fingers to make other inputs, such as on a touchscreen, without having to move or detach the attachment 500. Such contacts can be merely incidental or not essential for the secure attachment of the attachment 500 on the metacarpus. The intent is that the wearer is free to use one or more fingers while wearing the attachment 500 without having to adjust or remove the attachment 500.

The attachment 500 is configured to remain in place when worn against a metacarpus 802 of the hand 800. This prevents the attachment 500 from flying off the hand when an aggressive or pronounced gesture is made by the hand. The metacarpus has two sides defined as follows: a palm side (volar) comprising the palm of the hand, and a back side (dorsal) opposite the palm side (where the knuckles are visible). Unlike a device that is grasped, and can therefore accidentally fly away from the human's grasp during a sudden or aggressive gesture, the attachment 500 of the present disclosure stays or remains in place relative to the hand as the hand is moved, even aggressively or suddenly. To do so, the thin flexible element 602, 702 is bendable, and a portion (e.g., one or both end portions) of the flexible element 602, 702 wraps around at least a side of the metacarpus 802 as shown in FIG. 5 or around the entire metacarpus 802 as shown in FIG. 7. By "thin" it is meant that an overall length dimension of the flexible element 602, 702 is much greater than an overall width dimension thereof. Put another way, the flexible element 602, 702 is thin and long (or elongate), as ordinary people understand those terms, of such dimensions as would fit on an average adult human hand and of such flexibility as can conform to the shape of the portion of the hand on which the attachment 500 is worn. By "bendable," it is meant that the flexible element 602, 702 is conformal to the irregular shape of the metacarpus 802, which does not have a totally flat surface but rather can be slightly concave or convex or both, depending on which side of the hand the attachment is worn, with irregularities along the surface, such as protruding knuckles. The flexible element includes opposing end portions 620a, 620b that wrap around respective opposite sides of the metacarpus 802. The flexible element 602, 702 can bend to conform to the irregular shape of the metacarpus 802 against which it is fixed. Also, as humans have hands of varying widths, the flexible element has elastic properties that allow a width of the flexible element 602, 702 to stretch or contract to accommodate hands of different widths. The flexible element 602, 702 can be composed of a memory-less elastic material that is stretchable, bendable, and conformal to different shapes and different widths of different hands. Alternately, the flexible element 602, 702 can be bistable with a memory in two positions—flat and coiled up.

When used in an environment, such as a casino, in which many different people will wear the attachment 500, the attachment 500 advantageously overcomes a reluctance by some people to don or touch devices touched by many other people. A person will be more likely to be comfortable strapping on or wearing a thin, flexible band 702 (such as shown in FIG. 7) against the hand than to don a glove, for example. The surface area of the attachment 500 directly contacted by the hand is a function of the dimensions of the thin, flexible element 602, 702, whereas a glove would contact the entire surface area of both sides of the hand including the fingers. As described below, the electronics 502 for the attachment 500 are contained unobtrusively within a housing or module 510 that is incorporated or integrated into or onto or with the flexible element 602, 702. In this example, the term "module" connotes a structural component.

In general, a human person wears the attachment 500 by strapping it to the back of the hand or against the palm, and makes gestures with the attachment 500 using the hand on which it is worn. These gestures are detected and converted into signals representing characteristics of the gesture, such as any one or more of a position in three-dimensional (3D) space, an orientation of the attachment in the 3D space, an acceleration of the gesture, a velocity or speed of the gesture, a direction of the gesture in the 3D space, and the like. Gesture characteristic data encapsulated in the signals are communicated in real time or near real time by electronics in the attachment 500 to a system external from the attachment 500, such as the external system 46 and/or to the gaming terminal 10. The attachment 500 can be tethered to the external system 10, 46 by cables or conductors or can wirelessly transmit the gesture characteristic data representing the gesture characteristics to a wireless receiver of the external system 10, 46. If tethered, the data and power cabling can operate to prevent people from walking away with the attachment 500 when they are done using it. If untethered, the establishment that makes the attachments available 500 for use as a human-machine interface can expect that the users will take the attachments 500 with them or will return them to a designated location once done using them. The attachment 500 can also be configured with an alarm (not shown) that emits an audible alarm if it is moved out of the predefined proximity of the gaming terminal 10 or the external system 46.

Figure 4:
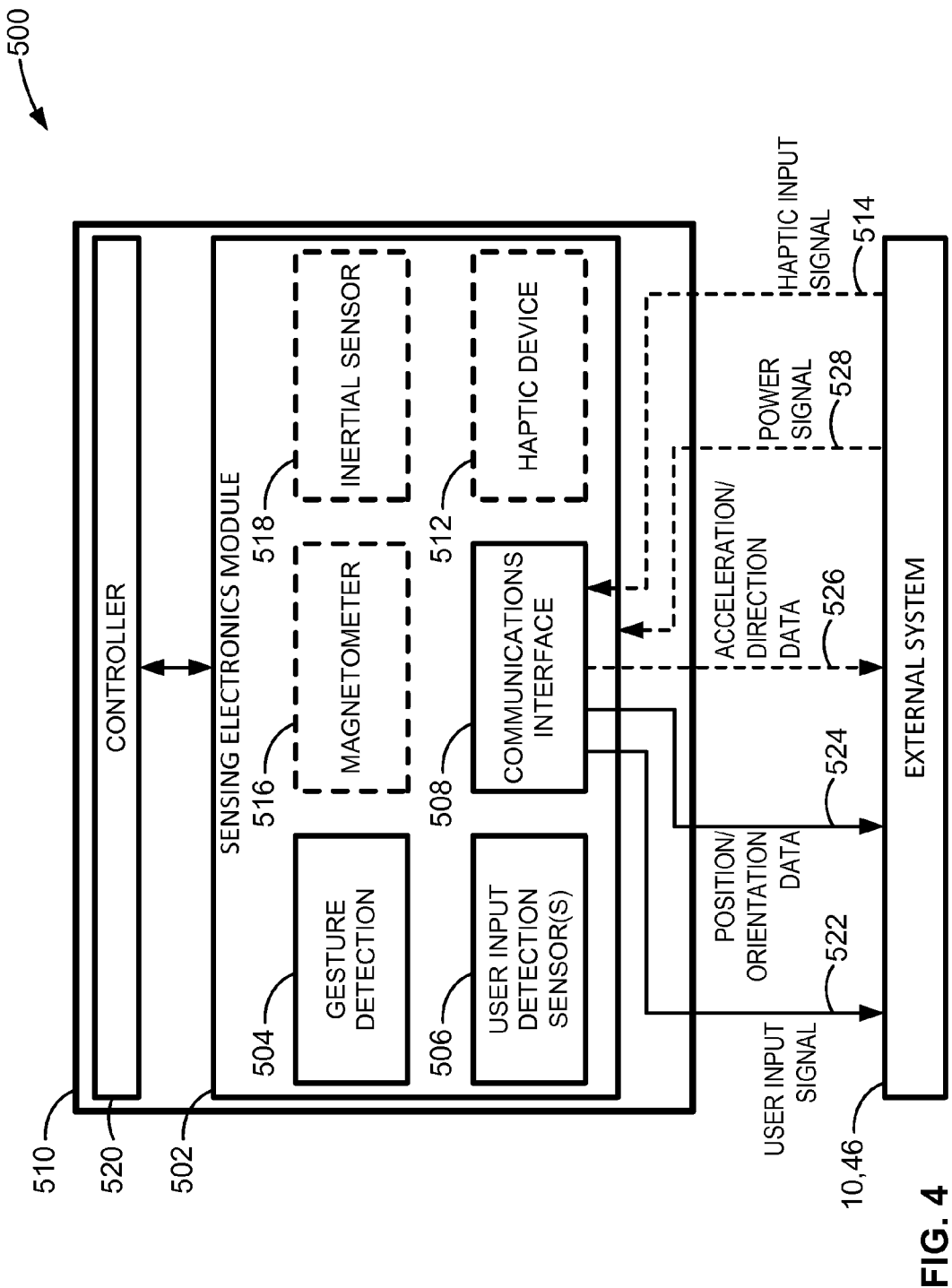
FIG. 4 is a functional block diagram of some exemplary components of an attachment according to some aspects of the present disclosure.

As shown in FIG. 4, the attachment 500 includes a sensing electronics module 502 coupled to the flexible element 602, 702. The sensing electronics module 502 includes sensing electronics 504, 506 configured to detect a position and an orientation of the flexible element 602, 702 as the hand against which the flexible element is worn makes a gesture. The sensing electronics module 502 includes a communications interface 508 configured to communicate position and orientation data 524 corresponding to the position and the orientation of the flexible element as the gesture is made. Details of the sensing electronics 504, 506 are described in more detail below. In FIG. 4, the sensing electronics 504, 506 are labeled separately as gesture detection 504 and user input detection sensor(s) 506 because the sensing electronics 504, 506 is configured to sense or detect (these terms are used interchangeably) characteristics of a gesture made by a hand while wearing the attachment 500 and to convert sensed characteristics of those gestures into corresponding position and orientation information that is provided in representative form to the communications interface 508 for transmission to the external system 10, 46. The sensing electronics 504, 506 are also configured to detect a user input to produce a user input signal 522 that is sent to the external system 10, 46 via the communications interface 508.

The components of the sensing electronics module 502 are contained within a housing or module 510, which is incorporated or integrated into or onto or with the flexible element. The sensing electronics module 502 can include a flexible or rigid printed circuit board 610 (shown in FIG. 6) that is disposed in the housing or module 510. The sensing electronics module 502 includes one or more controllers 520, like the controller 42 described above. The printed circuit board 610 can include one or more power sources, such as batteries 630, to power the electronic components of the sensing electronics module 502. Any or all of the components can be incorporated as discrete electronic components, such as chips, or incorporated into a single component, such as an application specific integrated circuit (ASIC) chip.

The sensing electronics 506 can include a sensor (examples described below) responsive to a movement of one or more fingers of the hand (relative to which the attachment 500 is worn) to produce a user input signal indicative of a user input that is communicated via the communications interface

508. The sensor that produces the user input signal can be a light sensor 606 (shown in FIG. 6) positioned relative to the flexible element such that the movement of the one or more fingers corresponds to a closure of the hand to block the light sensor and thereby produce the user input signal. For example, when the attachment 500 is worn against a palm of a person's hand, and one or more fingers is/are closed so that the closed finger(s) block light that is received at the light sensor 606, the light sensor 606 detects this closure and produces the user input signal. In this example, the user closes one or more fingers, such as forms a first with the hand, to make a user input, such as a selection of an element displayed on a display device of the external system 10, 46. Alternately, when the other free hand (the one not wearing the attachment) blocks the light sensor 606, such as when the person makes a clapping gesture with both hands, light is blocked to the light sensor 606, which produces the user input signal that is interpreted by the external system 10, 46 as corresponding to an input. When the attachment 500 is worn on the back side of the hand instead of the palm side, the light sensor 606 can be blocked by placing the free hand (not hand not wearing the attachment 500) over the light sensor 606 on the hand that is wearing the attachment 500 to make a user input. An aperture 604 in the housing 510 allows the light sensor 606 to detect the level of ambient light present.

FIG. 6 illustrates many types of sensors, some or all of which can be incorporated into the attachment 500. For ease of illustration and discussion, many sensors are shown, not all of which are necessary to be included with the sensing electronics module 502. The sensors and other components shown in FIG. 6 are shown in a representative form and are not intended to represent a schematic illustration of the components shown.

The sensor can be a contact sensor 608 positioned relative to the flexible element 602, 702 such that the movement of the one or more fingers (of the hand wearing the attachment 500) corresponds to closure of the one or more fingers against the metacarpus 802 to make contact with the contact sensor 608 thereby producing the user input signal. If the attachment 500 is worn on the palm side of the hand, the wearer can close one or more fingers of the hand on which the attachment 500 is worn until the contact sensor 608 senses a contact. Alternately, if the attachment 500 is worn on the back side of the hand, the wearer can use the other free hand (the one not wearing the attachment 500) to make contact with the contact sensor 608.

The sensor can be a tension sensor 612a, 612b positioned relative to the flexible element to monitor a tension or pressure applied to the flexible element 602, 702 as one or more fingers (of the hand on which the attachment 500 shown in FIG. 4 is worn) move from an open position to a closed position to increase the tension or pressure sensed by the tension sensor 612a, 612b thereby producing the user input signal. Although two tension sensors 612a, 612b are shown in FIGS. 5 and 6, only one is necessary to sense a pressure applied to the flexible element 602, 702. As the hand transitions from an open position to a first position, the side ends of the metacarpus 802 extend outwardly away from the hand to apply a pressure on the one or more tension sensors 612a, 612b, which detect this increased pressure and convert it to a corresponding user input signal indicative of a user input. Examples of how the various sensors involved in generating the user input signal can be used to provide various inputs into a human-machine interface are described in more detail below.

The sensor can be a conventional switch 614 (shown in representative form FIG. 6) coupled to an extension 902 that protrudes lengthwise as shown in FIG. 9A along at least a part of one or more fingers (of the hand against which the attachment 500 is worn) such that the movement of the finger(s) causes a state of the switch 614 to change to cause the user input signal to be generated. The length of the extension 902 can, for example, extend one-third to two-thirds along the length of an average adult human finger, and can be made of a flexible material to flex or bend when the finger or fingers are bent toward the palm of the hand. When the attachment 500 is worn on the dorsal surface of the metacarpus 802, the extension 902 can extend along the dorsal surface of a finger and is connected to a small band or ring that engages the tip of the finger so that when the finger is bent toward the volar surface, the extension 902 will bend as well.

Returning to the attachment 500 of FIG. 4, the gesture detection module 504 of the sensing electronics module 502 can include a wireless transducer configured to use electromagnetic signals for determining the position and the orientation of the flexible element 602, 702. The details regarding the detection of the position and the orientation using the wireless transducer are not essential to the present disclosure. Example configurations, calibration, and detection schemes can be found in U.S. Provisional Application No. 61/540,662, filed Sep. 29, 2011, entitled "Wagering Game System Having Motion Sensing Controllers" [DKT 100.207PRV]. Each gaming terminal, such as the gaming terminal 10, includes one or more fixed wireless emitters 1010 (shown in FIGS. 10A-12), each of which emits magnetic fields that are received by a wireless receiver 640 (shown in FIG. 6) in the attachment 500. The (one or more) wireless emitter(s) 1010 includes three-axis electromagnetic sources that include three mutually orthogonal antennas that output magnetic fields along each axis. The wireless receiver 640 can include corresponding three-axis electromagnetic sensors that include three mutually orthogonal antennas that receive the magnetic fields outputted by the one or more wireless emitters 1010. The different magnetic fields can be differentiated using a multiplexing scheme, such as time division multiplexing, frequency division multiplexing, phase multiplexing, for example. The controller 520 converts the analog signals from the antennas of the wireless receiver 640 into corresponding digital data, using conventional components including any one or more of a time division multiplexer, an amplifier, a demodulator, or a low pass filter. The wireless receiver 640 uses magnetic fields outputted from the one or more wireless emitters 1010 to determine linear and angular position data in three-dimensional space. In aspects involving multiple wireless emitters, the other wireless emitter(s) 1010 can be fixed upon another adjacent gaming terminal(s) or a community video display device or at any other fixed location within the receiving range of the wireless receiver 640. The controller 520 can communicate the linear and angular position data as position data to the communications interface 508 for communication to the external system 10, 46. The external system 10, 46 uses the position data to determine gameplay movement during a wagering game, for example. As an alternative to magnetic field sensing, the gaming terminal can use optical sensing, inertial sensing, or the like alone or in conjunction with magnetic field sensing.

The sensing electronics module 502 can include a haptic device 512 for imparting haptic or force feedback to the hand in response to haptic input signals 514 received by the communications interface 508. The haptic input signals 514 can include signals that instruct the haptic device 512 of haptic characteristics, including any one or more of a time duration, an intensity, or a vibration profile or pattern. Responsive to receiving the haptic input signals 514, the haptic device 512

(which can include a conventional driver coupled to an actuator, which is coupled to a mass) provides haptic or force feedback in accordance with the haptic characteristics in the haptic input signals 514. The timing and characteristics of the haptic input signals 514 can be coordinated with a gesture made by the hand wearing the attachment 500 and/or with game play occurrences or events as a wagering game is being conducted. The haptic device 512 can be actuated in accordance with the haptic input signals 514 to provide tactile feedback to the wearer as a confirmation of a gesture or an input made with the attachment 500.

The sensing electronics module 502 can include a magnetometer 516 for determining the orientation of the flexible element 602, 702. The magnetometer 516 communicates orientation signals indicative of the orientation of the flexible element 602, 702 to the communications interface 508 for communication to the external system 10, 46. The orientation signals can indicate a pitch or yaw of the flexible element 602, 702 in 3D space relative to a home coordinate position, such as relative to gravity (earth) and magnetic north. The magnetometer 516 can alternatively be one or more gyroscopic devices that specify a movement in multiple spatial dimensions (e.g., x, y, and z coordinates) as well as rotational movement and acceleration of movement of the attachment 500.

The sensing electronics module 502 can include one or more inertial sensors 518 that sense an acceleration movement of the flexible element 602, 702 and a direction of the acceleration movement. The inertial sensor(s) 518 produce acceleration/direction data 526, which is provided to the communications interface 508 for transmission to the external system(s) 10, 46. The acceleration data is indicative of an acceleration of the flexible element 602, 702 detected by the inertial sensors 518, and the direction data is indicative of a direction in 3D space of the flexible element 602, 702 in a coordinate space.

The communications interface 508 can be coupled to one or more conductors (e.g., wires) carrying a power signal 528 and one or more of the data 514, 522, 524, 526 signals between the sensing electronics module 502 and the external system 10, 46 in aspects in which the attachment 500 is tethered to the external system 10, 46.

One form factor has been shown and described in connection with FIGS. 5 and 6 in which the attachment 500 resembles a U-shaped bracelet that is worn on the palm side 804 (shown in FIG. 8A) or back side of the metacarpus 802 of the hand 800. In FIG. 7, the attachment 500 includes a flexible element 702 in the form of a band composed of an elastic material. Like the flexible element 602 shown in FIG. 5, the flexible element shown in FIG. 7 can be worn against a palm side or a back side of the metacarpus of the hand. The flexible element 702 includes the sensing electronics module 502 described above including any combination of sensors and other components. When the sensing electronics module 502 of the flexible element 702 is worn against a palm side, the sensing electronics of the module 502 are configured to sense a movement of one or more fingers of the hand to produce a user input signal 522 indicative of a user input, which is transmitted by the communications interface 508 to an external system 10, 46.

A circumference of the flexible element 702 can be adjusted to accommodate different-sized metacarpi of different persons. An adjustable end 704 of the flexible element 702 is received within an aperture 706 in the housing 510 of the attachment 500. Guides 708 and a locking mechanism 710 shown in representative form in FIG. 7 allow the adjustable end 704 to be tightened or loosened (in the direction of arrow A) within the housing 510 to be securely and comfortably attached to and quickly and easily released from the wearer's hand. When the wearer of the attachment 500 shown in FIG. 7 makes a first (such as shown in FIGS. 8A and 8B), the expansion of the metacarpus at its peripheries causes the flexible element 702 to expand in the direction of arrow B, and if pressure sensors are present at these locations, they can detect the first closure and convert that into a corresponding user input signal that is provided to the communications interface 508.

FIG. 8A illustrates an example a palm side 804 of a metacarpus 802 of an average adult human hand 800. The sensing electronics module 502 shown can be any sensing electronics module 502 described herein, including the electronics shown and described in connection with FIGS. 5 and 6. FIGS. 8A and 8B illustrate an example of how a hand closure from an open hand position to a closed first position activates the light sensor 606 and/or the contact sensor 608 described above. Although four fingers are shown as being closed to form a fist, it is not necessary for the wearer to close all four fingers. One, two, three, or four fingers can be closed, depending on the location of the light or contact sensor 606, 608 on the flexible element 602, 702.

Figure 10C:
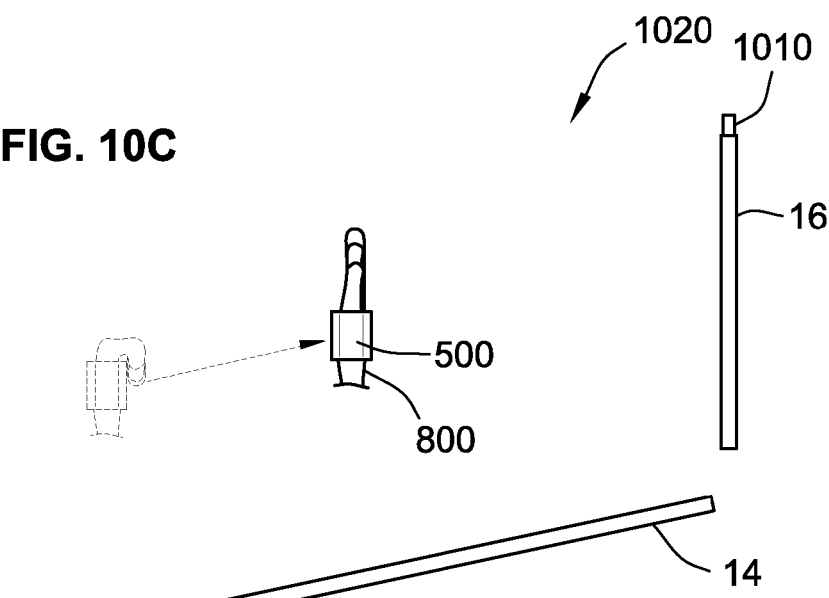

FIGS. 10A-10D illustrate sequences of a gesture made while wearing the attachment 500 and its corresponding effect on one or more graphical objects or elements displayed on one or more displays, such as the primary display area 14 and/or the secondary display area 16. In this example, each of the display areas 14, 16 include video displays configured to display graphical objects, such as graphical objects portrayed as part of a wagering game. The attachment 500 can be any attachment that incorporates any sensing electronics described herein. As described above, because the attachment 500 is worn on the back or palm side 804 of the metacarpus 802 and is not required to be held or grasped while making gestures, certain "hands-free" gestures can be made naturally with the attachment 500. For example, in the sequence 1000 shown in FIGS. 10A and 10B, the wearer of the attachment 500, in this example a player of a wagering game, desires to make a pie-throwing gesture toward a graphical target 1004 displayed on the secondary display area 16. In FIG. 10A, the player readies the hand 800 while wearing the attachment 500 (in this example against the palm side 804 of the metacarpus 802), and begins to move the hand 800 toward the secondary display area 16 as shown. The position and direction of the gesture is captured accordingly and coordinate information is communicated in real time from the communications interface 508 to the external system 10, 46, such as a gaming terminal 10 described above. The external system 10, 46 causes a pie graphic 1002 that appears to be balanced by a hand graphic 1006 to be displayed on the primary display area 14. The pie graphic 1002 is animated to move with the hand 800 as the gesture is made by moving the hand 800 together with the attachment 500 toward the secondary display area 16. In this example, the player's hand 800 is in a totally or partially closed first position, and this hand position can be detected by the light and/or contact sensors 606, 608 as described above. The totally or partially closed first approximates the position of a hand if it were readying to launch a real pie.

Figure 10D:
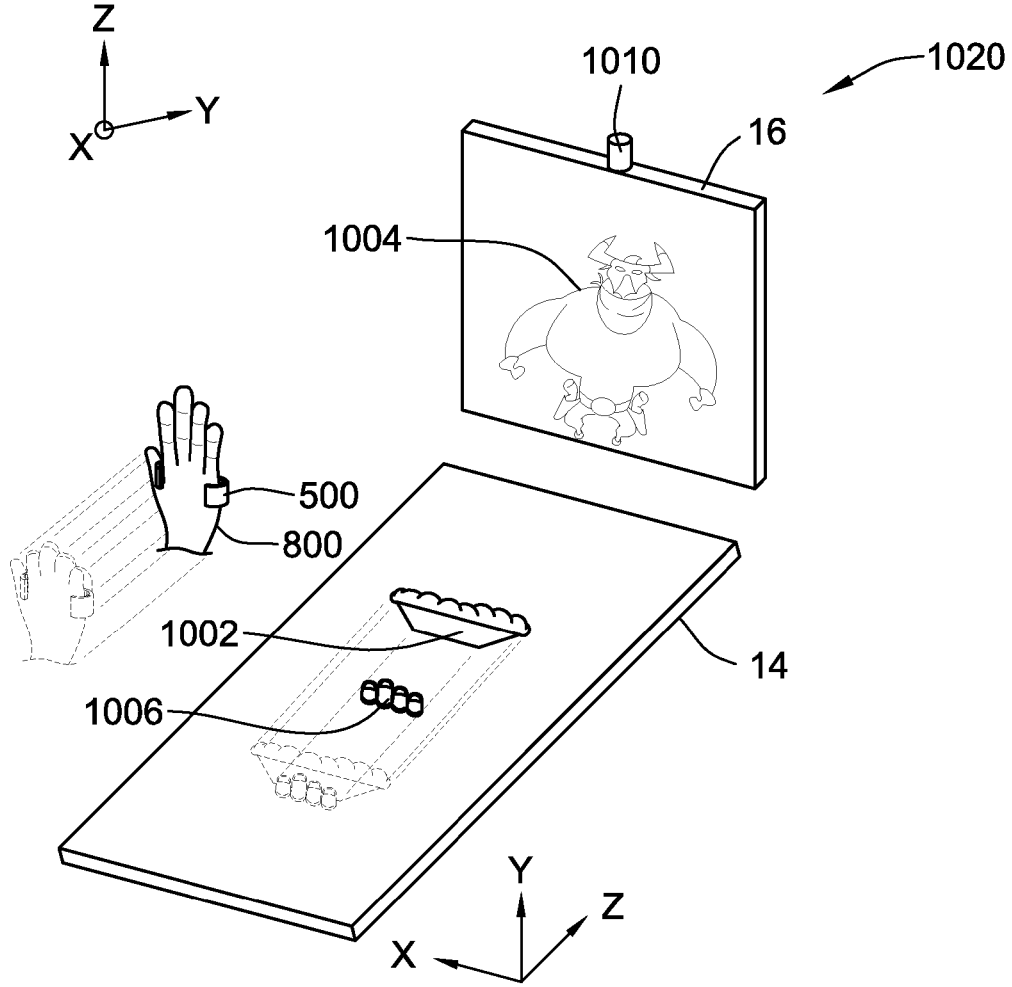

In the sequence 1020 shown in FIGS. 10C and 10D, the player's hand 800 has traveled partway along and above the surface of the primary display area 14 to form a gesture whose coordinates have been transmitted by the attachment 500 in real time to the external system 10, 46, and now the player's hand 800 is opened from the totally or partially closed first position to an open position (where the palm is fully exposed)

to indicate a release of the virtual "pie" being thrown by the player toward the graphical target 1004. The light or contact sensor 606, 608 of the attachment 500 detects that the player's hand 800 has been opened, and the communications interface 508 communicates that user input signal information to the external system 10, 46, which causes the pie graphic 1002 to appear to be released from the hand graphic 1006 and to be launched toward the graphical target 1004 displayed on the secondary display area 16. In this manner, the player has made a realistic gesture, akin to the gesture the player would naturally make if actually holding or balancing a pie in the hand. Note that the closing and opening of the hand corresponds to an input that is used to launch the virtual object (e.g, a pie) toward a target.

Of course, pie-throwing is just one of many example gestures that can be made with the attachment 500 of the present disclosure. Another example is shown in the sequences of FIGS. 11A-11D, which feature a football-throwing example. In this example sequence 1100 shown in FIGS. 11A-11B, a wearer of the attachment 500, such as a player of a wagering game, makes a closed-fist gesture while wearing the attachment 500, and the coordinates and orientation of the gesture are communicated by the communications interface 508 to the external system 10, 46 in real time as the gesture is made. The player here intends to throw a virtual football, represented on the primary display area 14 as a football graphic 1102 being grasped by a virtual hand graphic 1106 toward a football player, represented by a catcher graphic 1104 displayed on the secondary display area 16. The player maintains the closed-fist position while making a gesture that travels above and along the surface of primary display area 14. The gesture coordinates (position) and orientation in three-dimensional space are captured by the gesture detection module 504 and converted into corresponding position and orientation data, which is communicated by the communications interface 508 to the external system 10, 46.

Figures 11A, 11B:
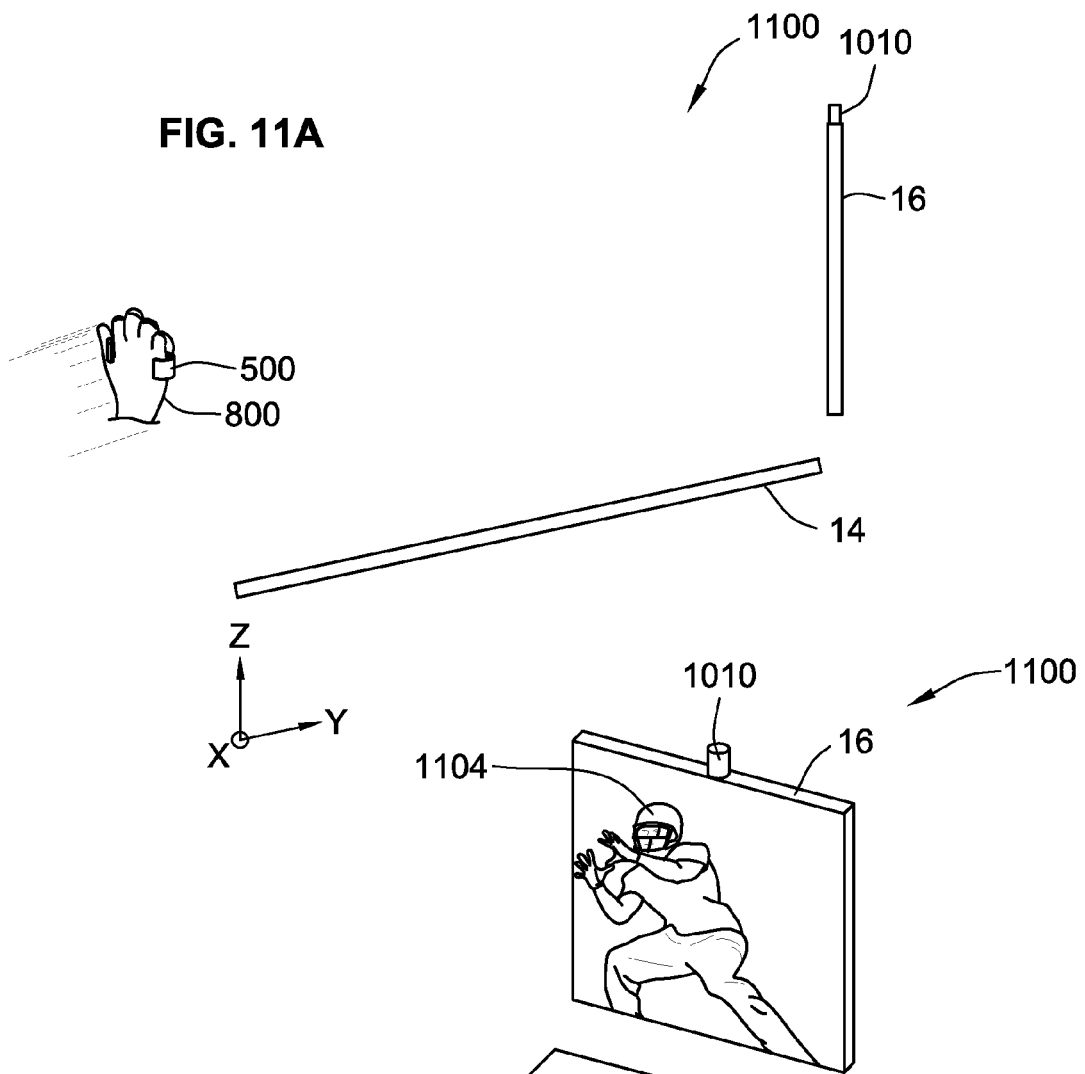

In the sequence 1120 shown in FIGS. 11C and 11D, the player's hand 800 has opened and the orientation has been changed by the player's twisting the wrist to orient the hand in an orientation different from the original orientation presented in the sequence 1100 shown in FIGS. 11A and 11B. The change in the orientation of the hand 800 is detected by the gesture detection module 504 and communicated, along with the position data, to the external system 10, 46 by the communications interface 508. When the player's hand 800 opens, the light or contact sensor 606, 608 of the attachment 500 detects the hand opening (and/or the pressure sensors 612 can detect the hand opening), and the football graphic 1102 is made to appear as if it has been thrown by the hand graphic 1106 in the direction and according to the orientation indicated by the gesture made by the hand 800 wearing the attachment 500. In this example, the football graphic 1102 appears to spin to the left as the player wearing the attachment 500 flicked the wrist in the same direction to change the orientation of the attachment 500. The player graphic 1104 is updated to cause the player graphic 1104 to move to the left (from the perspective of the player wearing the attachment 500) to catch the football target 1102. In general, the sequences 1100, 1120 describe a use of the attachment 500 in which the gesture made by the wearer wearing the attachment 500 includes both orientation and position characteristics in 3D space, and those characteristics are used to influence a moving graphical object that interacts with a target graphical object according to the position and orientation characteristics associated with the moving graphical object. As a result of the interaction, for example, a wagering game function can be executed, such as a selection of a symbol or element associated with the wagering game, the revelation of an award associated with the target graphical object, triggering another round of a primary wagering game or a bonus wagering game, and so forth.

Figure 12:
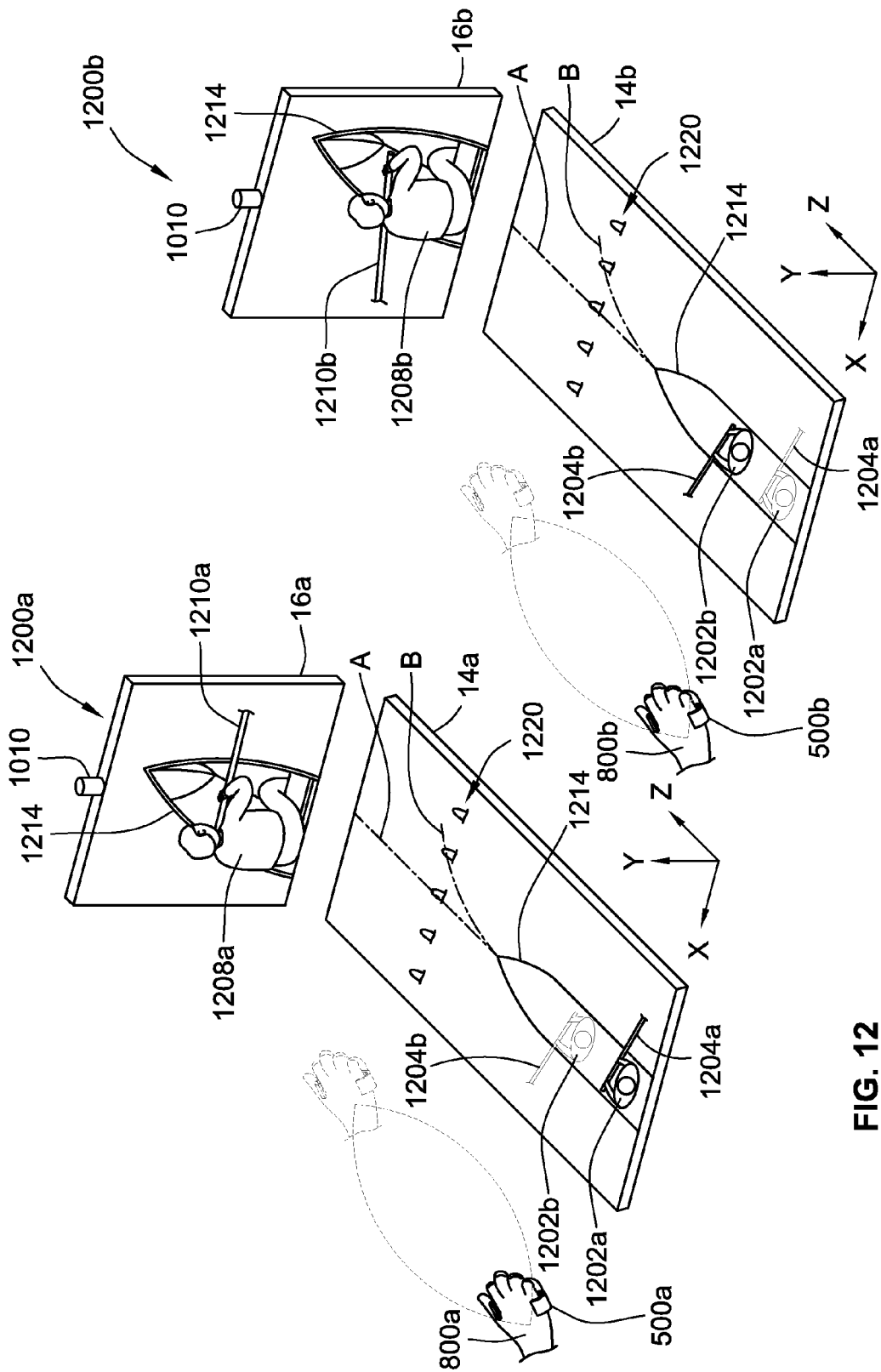
FIG. 12 illustrates an example two-player sequence in which both players wear their own separate attachments and coordinate their efforts to manipulate a movement or other characteristic of an object displayed via one or more display devices.

FIG. 12 illustrates a two-person implementation in which a first person wearing a first attachment 500a, which corresponds to the attachment 500, on a first hand 800a and a second person wearing a second attachment 500b, which also corresponds to the attachment 400, on a second hand 800b coordinate their gestures to accomplish a common goal or action involving one or more graphical objects displayed on one or more displays. In this example, the first and second persons are players of a wagering game, such as any wagering game described above, where the first player is playing a multi-player wagering game on a first gaming terminal 1200a, which can correspond, for example, to the gaming terminal 10 described above, and the second player is playing the same multi-player wagering game on a second gaming terminal 1200b, which can also correspond, for example, to the gaming terminal 10. The first gaming terminal 1200a includes a first primary display area 14a, which corresponds to the primary display area 14, and a first secondary display area 16a, which corresponds to the secondary display area 16. Likewise, the second gaming terminal 1200b includes a second primary display area 14b, which corresponds to the primary display area 14, and a second secondary display area 16b, which corresponds to the secondary display area 16.

In this example, the first and second players (represented by avatars 1202a, 1202b, respectively) try to synchronize or coordinate their gestures wearing different attachments 500a, 500b to carry out an action that involves a coordinated or synchronized effort. In this example, the effort involves two-person rowing, in which the first player controls a first of the oars, displayed as a first oar graphic 1204a, and the second player controls another oar, displayed as a second oar graphic 1204b, by gesturing with the respective attachment 500a, 500b in a coordinated or synchronized manner. To steer the boat, displayed as a boat graphic 1214 on the primary display area 14a, 14b and the secondary display area 16a, 16b, one of the players can gesture with the attachment 500a or 500b in a more aggressive or exaggerated manner compared to the other player's gesture. If both players synchronize their gestures using the attachments 500a, 500b, the boat 1214 will head along a straight path indicated by the arrow A. However, if the first player gestures using the attachment 500a more aggressively or in a more exaggerated manner compared to the other player wearing the attachment 500b, the boat 1214 will veer to the right in the direction of arrow B. The boat 1214 is heading toward targets 1220, and the players can coordinate or synchronize their gestures to try to aim or steer the boat toward one of the targets 1220. The targets 1220 are associated with corresponding outcomes, which are revealed to the player when the boat 1214 hits one of the targets 1220. The outcome corresponding to the hit target has already been predetermined even before any gesture is made with the attachments 500a, 500b, but nevertheless this synchronization or coordination among the players creates the impression that the players have control over the outcome of the wagering game. To ensure the boat 1214 is ultimately steered to the target 1220 that was already predetermined to be hit, external environmental factors, such as wind, can affect the direction of the boat 1214 despite the coordinated efforts of the players. In this manner, the players have the impression that, through their coordinated effort, they can control the boat, even though the target 1220 that the boat 1214 will hit has already been randomly preselected.

Each of the figures, described by way of example above, represents an algorithm that corresponds to at least some instructions executed by the controller 42 and/or external systems 46 in FIG. 2 or the controller 520 in FIG. 4 to perform the above described functions associated with the disclosed concepts. Any of the methods described herein can include machine or computer-readable instructions for execution by: (a) a processor, (b) a controller, such as the controller 42 or external systems 46 or the controller 520, and/or (c) any other suitable processing device. Any algorithm, software, or method disclosed herein can be embodied as a computer program product having one or more non-transitory tangible medium or media, such as, for example, a flash memory, a CD-ROM, a floppy disk, a hard drive, a digital versatile disk (DVD), or other memory devices, but persons of ordinary skill in the art will readily appreciate that the entire algorithm and/or parts thereof could alternatively be executed by a device other than a controller and/or embodied in firmware or dedicated hardware in a well-known manner (e.g., it may be implemented by an application specific integrated circuit (ASIC), a programmable logic device (PLD), a field programmable logic device (FPLD), discrete logic, etc.).

It should be noted that the algorithms illustrated and discussed herein as having various modules or blocks that perform particular functions and interact with one another. It should be understood that these modules are merely segregated based on their function for the sake of description and represent computer hardware and/or executable software code which is stored on a computer-readable medium for execution on appropriate computing hardware. The various functions of the different modules and units can be combined or segregated as hardware and/or software stored on a non-transitory computer-readable medium as above as modules in any manner, and can be used separately or in combination.

While particular embodiments and applications of the present disclosure have been illustrated and described, it is to be understood that this disclosure is not limited to the precise construction and compositions disclosed herein and that various modifications, changes, and variations can be apparent from the foregoing descriptions without departing from the spirit and scope of the invention as defined in the appended claims.

What is claimed is:

1. A gaming system configured to conduct a wagering game comprising:
   one or more input devices;
   one or more display devices;
   one or more processors;
   an external system interface;
   a hand-worn attachment for sensing a gesture, the attachment including:
      a thin flexible element configured to be worn at least partially around a metacarpus of a hand in a fixed relationship thereto, the flexible element being bendable and elongated and remaining in place relative to the hand as the hand is moved, a portion of the flexible element wrapping around a side of the metacarpus, and
      a sensing electronics module coupled to the flexible element, the sensing electronics module including sensing electronics configured to detect a position of the flexible element as the hand against which the flexible element is worn makes a gesture, the sensing electronics module further including a communications interface configured to communicate to the external system interface position data corresponding to the position of the flexible element as the gesture is made; and
   one or more memory devices storing instructions that, when executed by the at least one or more processors, cause the gaming system to:
      receive an input, via the one or more input devices, indicative of a wager;
      cause a wagering game to be displayed on the one or more display devices; and
      receive the position data from the attachment as the wagering game is displayed on the one or more display devices.

2. The gaming system of claim 1, wherein the attachment further includes a haptic device for imparting haptic feedback to the hand in response to haptic input signals received by the communications interface of the attachment, the one or more memory devices further causing the gaming system to communicate via the external system interface to the communications interface of the attachment the haptic input signals as the wagering game is displayed on the one or more display devices.

3. The gaming system of claim 1, wherein the one or more memory devices further cause the gaming system to:
   cause to be displayed on at least one of the one or more display devices a graphic that is part of the wagering game, where the graphic appears to move with the attachment as the gesture is made;
   receive at the external system interface from the communications interface of the attachment a user input signal indicating that the gesture no longer affects the movement of the graphic, and responsive thereto, cause the graphic to appear to move in a manner that is not influenced by any gesture made by the attachment.

4. The gaming system of claim 3, wherein the user input signal is produced by the attachment detecting a transition of the hand between a closed fist position and an open palm position.

5. The gaming system of claim 1, wherein the one or more memory devices further cause the gaming system to:
   cause to be displayed on at least one of the one or more display devices a graphic that is part of the wagering game, where the graphic appears to be grasped by the hand of the player wearing the attachment while the gesture is made;
   receive at the external system interface from the communications interface of the attachment a user input signal indicating a release of the graphic from appearing to be grasped by the hand such that the gesture no longer affects the movement of the graphic, and responsive thereto, cause the graphic to appear to move in a manner that is not influenced by any gesture made by the attachment.

6. The gaming system of claim 5, wherein the user input signal is produced by the attachment detecting a transition of the hand from a closed fist position to an open palm position.

7. The gaming system of claim 5, wherein the one or more memory devices further cause the gaming system to:
   responsive to receiving the user input signal, receive at the external system interface from the communications interface of the attachment orientation data indicating a change in an orientation of the attachment, and responsive thereto, cause a trajectory of the graphic to appear to change in a manner corresponding to the orientation data as displayed on at least one of the one or more display devices.

8. The gaming system of claim 1, further comprising:
a second hand-worn attachment for sensing a gesture made by a second player, the second attachment including:
   a thin flexible element configured to be worn against a metacarpus of a hand of the second player in a fixed relationship relative to the metacarpus of the hand of the second user, the flexible element of the second attachment being bendable and elongated and remaining in place relative to the hand of the second player as the hand of the second user is moved, a portion of the flexible element of the second attachment wrapping around a side of the metacarpus of the hand of the second player, and
   a sensing electronics module coupled to the flexible element of the second attachment, the sensing electronics module of the second attachment including sensing electronics configured to detect a position of the flexible element of the second attachment as the hand of the second player against which the flexible element of the second attachment is worn makes a gesture, the sensing electronics module of the second attachment further including a communications interface configured to communicate to the external system interface position data corresponding to the position of the flexible element of the second attachment as the gesture is made by the hand of the second player;
wherein the instructions further cause the gaming system to:
   cause to be displayed on at least one of the one or more display devices a graphic that is part of the wagering game and whose movement is controlled by a first player wearing the attachment and a second player wearing the second attachment; and
   cause the graphic to move in a manner influenced by the position data from the attachment worn by the first player and the position data from the second attachment worn by the second player.

9. A computer-implemented method of conducting wagering games on a wagering game system, the wagering game system including one or more input devices, one or more display devices, and one or more processors, the method comprising:
receiving, via at least one of the one or more input devices, a wager to initiate a wagering game on the wagering game system;
displaying, via at least one of the one or more display devices, a graphic that is part of the wagering game;
randomly selecting, via at least one of the one or more processors, a game outcome from a plurality of game outcomes;
receiving at an external system interface from a hand-worn attachment having a thin flexible element configured to be worn at least partially around a metacarpus of a hand in a fixed relationship thereto, position data indicating a position of the attachment in three-dimensional space; and
causing the graphic to be displayed, via at least one of the one or more display devices, so as to move in a manner corresponding to the position data received from the attachment.

10. The computer-implemented method of claim 9, wherein the flexible element is bendable and remains in place relative to the hand as the hand is moved, a portion of the flexible element wrapping around a side of the metacarpus, an overall length dimension of the flexible element being greater than an overall width dimension thereof.

11. The computer-implemented method of claim 9, further comprising:
receiving at the external system interface from the communications interface of the attachment a user input signal indicating that the gesture no longer affects the movement of the graphic, and responsive thereto, causing the graphic to appear to move in a manner that is not influenced by any gesture made by the attachment.

12. The computer-implemented method of claim 9, further comprising:
portraying the graphic as appearing to be grasped by the hand of the player wearing the attachment while the gesture is made; and
receiving at the external system interface a user input signal from the attachment, indicating a release of the graphic from appearing to be grasped by the hand such that the gesture no longer affects the movement of the graphic, and responsive thereto,
causing the graphic to appear to move in a manner that is not influenced by any gesture made by the attachment.

13. The computer-implemented method of claim 12, further comprising:
responsive to receiving the user input signal, receiving at the external system interface from the attachment orientation data indicating a change in an orientation of the attachment, and responsive thereto, causing a trajectory of the graphic to appear to change in a manner corresponding to the orientation data as displayed via at least one of the one or more display devices.

14. One or more physical non-transitory machine-readable storage media including instructions which, when executed by one or more processors, cause the one or more processors to perform operations comprising:
receiving, via at least one of the one or more input devices, a wager to initiate a wagering game on the wagering game system;
displaying, via at least one of the one or more display devices, a graphic that is part of the wagering game;
randomly selecting, via at least one of the one or more processors, a game outcome from a plurality of game outcomes;
receiving at an external system interface from a hand-worn attachment having a thin flexible element configured to be worn at least partially around a metacarpus of a hand in a fixed relationship thereto, position data indicating a position of the attachment in three-dimensional space; and
causing the graphic to be displayed, via at least one of the one or more display devices, so as to move in a manner corresponding to the position data received from the attachment.

15. The one or more physical non-transitory machine-readable storage media of claim 14, wherein the flexible element is bendable and remains in place relative to the hand as the hand is moved, a portion of the flexible element wrapping around a side of the metacarpus, an overall length dimension of the flexible element being greater than an overall width dimension thereof.

16. The one or more physical non-transitory machine-readable storage media of claim 14, the operations further comprising:
receiving at the external system interface from the communications interface of the attachment a user input signal indicating that the gesture no longer affects the movement of the graphic, and responsive thereto, causing the graphic to appear to move in a manner that is not influenced by any gesture made by the attachment.

17. The one or more physical non-transitory machine-readable storage media of claim 14, the operations further comprising:

portraying the graphic as appearing to be grasped by the hand of the player wearing the attachment while the gesture is made; and receiving at the external system interface a user input signal from the attachment, indicating a release of the graphic from appearing to be grasped by the hand such that the gesture no longer affects the movement of the graphic, and responsive thereto, causing the graphic to appear to move in a manner that is not influenced by any gesture made by the attachment.

18. The one or more physical non-transitory machine-readable storage media of claim 17, the operations further comprising:

responsive to receiving the user input signal, receiving at the external system interface from the attachment orientation data indicating a change in an orientation of the attachment, and responsive thereto, causing a trajectory of the graphic to appear to change in a manner corresponding to the orientation data as displayed via at least one of the one or more display devices.

19. A hand-worn attachment for sensing a gesture made in connection with a gaming system configured to conduct a wagering game, the hand-worn attachment comprising:

a thin flexible element configured to be worn at least partially around a metacarpus of a hand in a fixed relationship thereto, the flexible element being bendable and elongated and remaining in place relative to the hand as the hand is moved, a portion of the flexible element wrapping around a side of the metacarpus; and a sensing electronics module coupled to the flexible element, the sensing electronics module including sensing electronics configured to detect a position and an orientation of the flexible element as the hand against which the flexible element is worn makes a gesture, the sensing electronics module further including a communications interface configured to communicate position and orientation data to the gaming system as the wagering game is displayed on one or more display device of the gaming system, the position and orientation data corresponding to the position and the orientation of the flexible element as the gesture is made.

20. The attachment of claim 19, wherein the sensing electronics include a sensor responsive to a movement of one or more fingers of the hand to produce a user input signal indicative of a user input that is communicated via the communications interface.

21. The attachment of claim 20, wherein the sensor is a light sensor positioned relative to the flexible element such that the movement of the one or more fingers corresponds to a closure of the hand to block the light sensor and thereby produce the user input signal, or wherein the sensor is a contact sensor positioned relative to the flexible element such that the movement of the one or more fingers corresponds to closure of the one or more fingers against the metacarpus to make contact with the contact sensor thereby producing the user input signal, or wherein the sensor is a tension sensor positioned relative to the flexible element to monitor a tension or pressure applied to the flexible element as the one or more fingers move from an open position to a closed position to increase the tension or pressure sensed by the tension sensor thereby producing the user input signal, or wherein the sensor is a switch coupled to an extension that protrudes lengthwise along at least a part of the one or more fingers such that the movement causes a state of the switch to change to cause the user input signal to be generated.

22. The attachment of claim 19, wherein the flexible element is composed of a bendable, compliant material that conforms to a back side of the metacarpus opposing a palm side of the hand, the portion of the flexible element including opposing end portions that wrap around respective opposite sides of the metacarpus.

23. The attachment of claim 19, wherein the flexible element is a band composed of an elastic material and when the sensing electronics module is worn against a palm side of the metacarpus of the hand, the sensing electronics being configured to sense a movement of one or more fingers of the hand to produce a user input signal indicative of a user input, the user input signal being transmitted by the communications interface.

24. The attachment of claim 19, wherein the sensing electronics include a wireless transducer configured to use electromagnetic signals for determining at least one of the positions or the orientation of the flexible element.

25. The attachment of claim 19, wherein the sensing electronics module further includes a haptic device for imparting haptic feedback to the hand in response to haptic input signals received by the communications interface.

26. The attachment of claim 19, wherein the sensing electronics module further includes a magnetometer for determining an orientation of the flexible element, the magnetometer producing orientation data indicative of the determined orientation.

27. The attachment of claim 19, wherein the sensing electronics module further includes one or more inertial sensors that sense an acceleration movement of the flexible element and a direction of the acceleration movement.

28. The attachment of claim 19, wherein no part of the attachment contacts an extremity portion of any finger of the hand as the attachment is worn against the metacarpus when the hand is in an open palm position.

29. The attachment of claim 19, wherein all fingers of the hand are free to make other inputs when the attachment is worn on the hand.

\* \* \* \* \*